(12) United States Patent
Alshehri

(10) Patent No.: US 11,713,676 B2
(45) Date of Patent: Aug. 1, 2023

(54) SENSOR NODE DEVICE, SENSOR NODE SYSTEM, AND METHOD FOR MAPPING HYDRAULIC FRACTURES USING THE SAME

(71) Applicant: SAUDI ARABIAN OIL COMPANY, Dhahran (SA)

(72) Inventor: Abdallah A. Alshehri, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 158 days.

(21) Appl. No.: 17/396,194

(22) Filed: Aug. 6, 2021

(65) Prior Publication Data

US 2023/0038545 A1    Feb. 9, 2023

(51) Int. Cl.
*E21B 49/00* (2006.01)
*H04W 76/10* (2018.01)
(Continued)

(52) U.S. Cl.
CPC .......... *E21B 49/00* (2013.01); *E21B 41/0085* (2013.01); *E21B 43/26* (2013.01);
(Continued)

(58) Field of Classification Search
CPC ................................. E21B 43/26; E21B 49/00
See application file for complete search history.

(56) References Cited

U.S. PATENT DOCUMENTS 8,269,648 B2 * 9/2012 Benischek .............. E21B 47/13
340/855.8
9,482,782 B2 * 11/2016 Kamal ................... G01V 11/00
(Continued)

FOREIGN PATENT DOCUMENTS

EP    2 389 498 B1    11/2012

OTHER PUBLICATIONS

Alshehri, Abdallah et al., "FracBots: Overview and Energy Consumption Analysis"; Proceedings of the SPE Middle East Oil and Gas Show and Conference; Paper No. SPE-194945-MS; pp. 1-13; Mar. 18-21, 2019 (13 pages).
(Continued)

*Primary Examiner* — Kenneth L Thompson
(74) *Attorney, Agent, or Firm* — Osha Bergman Watanabe & Burton LLP

(57) ABSTRACT

A sensor node system for mapping hydraulic fractures may include a localization system that identifies location information of the sensor node device with respect to an area of interest in a rock formation. The location information may include various magnetization parameters indicative of various signal strengths surrounding the sensor node device. The sensor node device may include a transceiver that exchanges signals with a base station and at least one other sensor node device. The transceiver establishes a communication link between the base station and the sensor node device. The transceiver may monitor at least one other communication link between the at least one other sensor node device and the base station. The sensor node device may include a processor that identifies distance information based on the location information and a predetermined number of signals associated to the various signal strengths surrounding the sensor node device.

20 Claims, 22 Drawing Sheets

(51) Int. Cl.
  *H04W 4/02* (2018.01)
  *E21B 47/07* (2012.01)
  *E21B 41/00* (2006.01)
  *E21B 47/12* (2012.01)
  *E21B 43/26* (2006.01)

(52) U.S. Cl.
  CPC .............. *E21B 47/07* (2020.05); *E21B 47/12* (2013.01); *H04W 4/023* (2013.01); *H04W 76/10* (2018.02); *E21B 2200/20* (2020.05)

(56) References Cited

U.S. PATENT DOCUMENTS

| | | | |
|---|---|---|---|
| 10,465,505 B2 | 11/2019 | Disko et al. | |
| 10,689,974 B2* | 6/2020 | Babakhani | E21B 43/267 |
| 11,579,325 B2* | 2/2023 | Al-Shehri | H04L 41/145 |
| 2011/0276272 A1* | 11/2011 | Artman | G01V 1/282 |
| | | | 702/16 |
| 2016/0160642 A1* | 6/2016 | Hall | E21B 49/008 |
| | | | 166/305.1 |
| 2016/0281498 A1* | 9/2016 | Nguyen | C09K 8/80 |
| 2016/0356665 A1 | 12/2016 | Felemban et al. | |
| 2018/0320507 A1 | 11/2018 | Mulholland et al. | |
| 2019/0136120 A1* | 5/2019 | Surjaatmadja | E21B 43/26 |

OTHER PUBLICATIONS

Alshehri, Abdallah A. et al., Wireless Fracbot (Sensor) Nodes: Performance Evaluation of Inductively Coupled Near Field Communication (NFC); Proceedings of the 2018 IEEE Sensors Applications Symposium (SAS); Mar. 12-14, 2018 (6 pages).

Al-Shehri, Abdallah A. et al., "FracBot Technology for Mapping Hydraulic Fractures"; Proceedings of the SPE Annual Technical Conference and Exhibition; Paper No. SPE-187196-MS; pp. 1-13; Oct. 9-11, 2017 (13 pages).

Martins, Carlos H. et al., "Novel Ml-based (FracBot) Sensor Hardware Design for Monitoring Hydraulic Fractures and Oil Reservoirs"; Proceedings of the 2017 IEEE 8th Annual Ubiquitous Computing, Electronics and Mobile Communication Conference (UEMCON); Oct. 19-21, 2017 (7 pages).

Gysling, Daniel L. et al., "Changing Paradigms in Oil and Gas Reservoir Monitoring—The Introduction and Commercialization of In-Well Optical Sensing Systems"; Proceedings of the 2002 15th Optical Fiber Sensors Conference Technical Digest: OFS 2002 (Cat. No. 02EX533); vol. 1; pp. 43-46; May 10, 2012 (4 pages).

Duru, Obinna et al., "Modeling Reservoir Temperature Transients and Matching to Permanent Downhole Gauge Data for Reservoir Parameter Estimation"; Proceedings of the SPE Annual Technical Conference and Exhibition; Paper No. SPE-115791-MS; pp. 1-16; Sep. 21-24, 2008 (16 pages).

Warpinski, Norman R., "Hydraulic Fracture Diagnostics"; Journal of Petroleum Technology; vol. 48, Issue 10 Paper No. SPE-36361-JPT; pp. 907-910; Oct. 1996 (4 pages).

Barree, R.D. et al., "A Practical Guide to Hydraulic Fracture Diagnostic Technologies"; Proceedings of the SPE Annual Technical Conference and Exhibition; Paper No. SPE-77442-MS; pp. 1-12; Sep. 29-Oct. 2, 2002 (12 pages).

Chapman, David et al., "Meeting the Challenges of Oilfield Exploration Using Intelligent Micro and Nano-Scale Sensors"; Proceedings of the 2012 12th IEEE International Conference on Nanotechnology (IEEE-NANO); Aug. 20-23, 2012 (6 pages).

Alshehri, Abdallah Awadh, "Fracbot: Design of Wireless Underground Sensor Networks for Mapping Hydraulic Fractures and Determining Reservoir Parameters in Unconventional Systems"; Georgia Institute of Technology: A Thesis Presented to The Academic Faculty in Partial Fulfillment of the Requirements for the Degree Doctor of Philosophy in the School of Electrical and Computer Engineering; pp. iii-155; May 2018 (171 pages).

Kisseleff, Steven et al., "Survey on Advances in Magnetic Induction based Wireless Underground Sensor Networks"; IEEE Internet of Things Journal; pp. 1-18; Sep. 13, 2018 (18 pages).

* cited by examiner

SENSOR NODE DEVICE, SENSOR NODE SYSTEM, AND METHOD FOR MAPPING HYDRAULIC FRACTURES USING THE SAME

BACKGROUND

Wireless Underground Sensor Networks (WUSNs) are networks that interconnect sensor nodes wirelessly. These nodes can be deployed in a variety of underground environments, such as shallow soil, underground tunnels, and hydrocarbon reservoirs. Applications involving WUSNs require knowing location information for any randomly deployed sensor nodes. However, challenging underground environments prevent any direct application of the conventional localization solutions based on the propagation properties of electromagnetic (EM) waves or Global Positioning System (GPS) triangulations because of their extremely short communication ranges and highly unreliable channel conditions.

SUMMARY

In general, in one aspect, embodiments disclosed herein relate to a sensor node system for mapping hydraulic fractures. The sensor node device includes a localization system that identifies location information of the sensor node device with respect to an area of interest in a rock formation. The location information includes various magnetization parameters indicative of various signal strengths surrounding the sensor node device. The sensor node device includes a transceiver that exchanges signals with a base station and at least one other sensor node device. The transceiver establishes a communication link between the base station and the sensor node device. The transceiver monitors at least one other communication link between the at least one other sensor node device and the base station. The sensor node device includes a processor that identifies distance information based on the location information and a predetermined number of signals associated to the various signal strengths surrounding the sensor node device. The sensor node device includes a coordination system that maps a real time position of the sensor node device in the rock formation based on the distance information identified.

In general, in one aspect, embodiments disclosed herein relate to a sensor node system for mapping hydraulic fractures. The sensor node system includes a base station. The base station includes a transmitter coupled to a first processor that establishes a first number of communication links with various sensor node devices. The base station includes a receiver coupled to the first processor that monitors a number of sensor node statuses corresponding to the various sensor node devices. The sensor node system includes a sensor node device. The sensor node device includes a localization system that identifies location information of the sensor node device with respect to an area of interest in a rock formation. The location information includes various magnetization parameters indicative of various strengths surrounding the sensor node device. The sensor node device includes a transceiver that exchanges signals with the base station and at least one other sensor node device. The transceiver establishes a communication link between the base station and the sensor node device. The transceiver monitors at least one other communication link between the at least one other sensor node device and the base station. The sensor node device includes a second processor that identifies distance information based on the location information and a predetermined number of signals associated to the plurality of signal strengths surrounding the sensor node device. The sensor node device includes a coordination system that maps a real time position of the sensor node device in the rock formation based on the distance information identified.

In general, in one aspect, embodiments disclosed herein relate to a method for mapping hydraulic fractures using a sensor node system. The method includes establishing, by a base station, a communication link with a sensor node device. The method includes monitoring, by the base station, a sensor node status corresponding to the sensor node device. The method includes identifying, by the sensor node device, location information of the sensor node device with respect to an area of interest in a rock formation. The location information includes various magnetization parameters indicative of various signal strengths surrounding the sensor node device. The method includes exchanging signals among the base station and the sensor node device. The method includes monitoring, by the sensor node device, at least one other communication link between at least one other sensor node device and the base station. The method includes identifying distance information based on the location information and a predetermined number of signals associated to the various signal strengths surrounding the sensor node device. The method includes mapping a real time position of the sensor node device in the rock formation based on the distance information identified. The method includes storing, by a memory, one or more sensor node device properties by indexing the one or more sensor node device properties identified based on the distance information and at least one other sensor node status associated to the at least one other sensor node device. The method includes combining the one or more sensor node device properties, the distance information, and the at least one other sensor node status to map the real time position of the sensor node device in the rock formation. The real time position of the sensor node device in the rock formation corresponds to a hydraulic fracture in the rock formation.

Other aspects of the disclosure will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Figure 1:
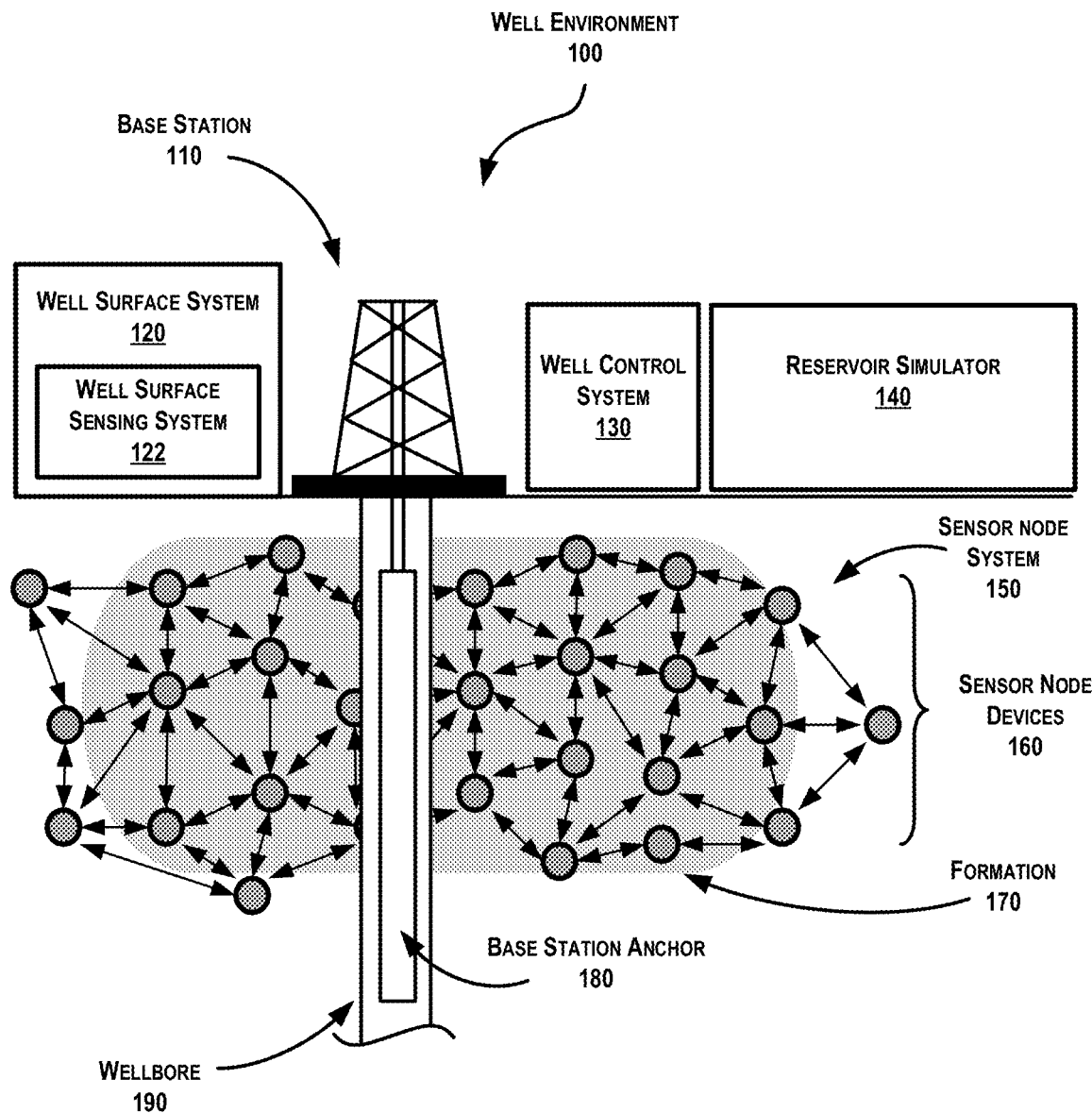
FIG. 1 shows a schematic diagram of a well system in accordance with one or more embodiments.

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include systems and methods for using location determining algorithms and convergence technology to map various sensor node devices in fractured hydrocarbon reservoirs. For example, sensor node devices of a well system may be tracked by a reservoir simulator to identify their proximate locations in real time. Specifically, sensor node devices injected into a fracture may spread in various branching paths throughout a hydraulic fracture ("fracture") into a hydrocarbon reservoir ("reservoir"). The sensor node devices may be miniature sensors (e.g., FracBots) configured to transmit and receive signals using Magnetic Induction (MI). Accordingly, in some embodiments, a reservoir simulator may maintain a constant feed of Received Magnetic Field Strengths (RMFS) measurements from the MI-based communication exchanges between the sensor node devices. Using the RMFS measurements and various reference locations (i.e., known locations in the reservoir), an exact location of the sensor node devices may be approximated at all times of the injection process and after the sensor node devices have stopped moving in the fracture. As a result, a network map may be created including the exact location of each sensor node device injected in the fracture.

Using the RMFS measurement values and the various reference locations, a distance approximation algorithm and a three-dimensional (e.g., 3D) triangulation algorithm may assist in determining a proximate location of the sensor node devices. For example, the reservoir simulator may evaluate the RMFS measurement values to estimate distances between sensor node devices and the reference locations and between sensor node devices pairs. The various reference locations may be along a base station anchor disposed in a wellbore such that an initial network map may be generated including the exact location of the base station anchor. Sensor node device pairs may be neighboring sensor node devices capable of communication exchanges with one another, these exchanges may be limited only by the computational capacities of the system. As such, to determine the approximate location of the sensor node devices in the reservoir, the reservoir simulator may seek to estimate distances from the base station anchor to sensor node devices with the highest RMFS values. Once these distances are estimated, the reservoir simulator may verify the estimated distances by calculating locations in the reservoir for each sensor node device with respect to the base station anchors.

In one or more embodiments, the aforementioned systems and methods provide MI-based wireless sensor nodes to be used as a platform for a new generation of Wireless Underground Sensor Networks (WUSNs) for monitoring hydraulic fractures, unconventional reservoirs, and measuring other wellbore parameters. In some embodiments, the MI-based wireless sensor nodes provide feasibility and capability of using MI-based communication in underground environments for collecting information such as temperature, pressure, chemical composition and other variables in underground environments.

The aforementioned systems and methods may be based on short range communication using near field communication (NFC) as a physical layer combined with an energy harvesting capability and ultra-low power requirements. In this case, the combination of NFC and MI techniques is not commonly implemented in inter-node communication for WUSNs in underground environment. Thus, efficient node design may require restricted characteristics that sustain operations in harsh environments with high path loss, high temperature, pressure, and limited energy. In addition, the sensor node devices described herein optimize every electronic component based on their requirements as it can save development time, board space, and cost. In some embodiments, the sensor node devices described herein provide long operating times, ultra-low power, at least one processing function, at least one efficient communication layer, and a combination of energy-harvesting and sensing capabilities. The simultaneous implementation of all five features may enable each sensor node device to run in a powered status over many years (e.g., the life of the well, or longer).

In one or more embodiments, the performance of the sensor node devices is optimized using specific hardware design. The sensor node devices may be operated over many years with minimum energy radiated conditions. In this regard, the sensor node devices may maintain low power consumption while establishing communication links for transmitting data in well site environments (i.e., exchanging data and control signals through air, water, sand, and stone media. In well site environments, the sensor node devices may transmit data using data modulation with a data rate of 1.6 kilobits per second.

Turning to FIG. 1, FIG. 1 shows a schematic diagram in accordance with one or more embodiments. As shown in FIG. 1, FIG. 1 illustrates a well environment 100 that includes a reservoir located in a subsurface formation "formation" 170 and a well system including a base station 110. The formation 170 may include a porous or fractured rock formation that resides underground, beneath Earth's surface ("surface"). In the case of the well system being a hydrocarbon well, the reservoir may include a portion of the formation 170 that includes a subsurface pool of hydrocarbons, such as oil and gas. The formation 170 and the reservoir may include different layers of rock having varying characteristics, such as varying degrees of permeability, porosity, and resistivity. In the case of the well system being operated as a production well, the well system may facilitate the extraction of hydrocarbons (or "production") from the reservoir.

In some embodiments, the well system includes a base station (110) interposed through a wellbore 190 using a base station anchor 1180, a sensor node system 150, a well surface system 120, and a well control system ("control system") 130. The control system 130 may control various operations of the well system, such as well production operations, well completion operations, well maintenance operations, and reservoir monitoring, assessment and development operations. In some embodiments, the control system (140) includes a computer system that is the same as or similar to that of computer system 1700 described below in FIG. 17 and the accompanying description.

The wellbore 190 may include a bored hole that extends from the surface into a target zone of the formation 170, such as the reservoir. An upper end of the wellbore 190, terminating at or near the surface, may be referred to as the "up-hole" end of the wellbore 190, and a lower end of the wellbore, terminating in the formation 170, may be referred to as the "down-hole" end of the wellbore 190. The wellbore 190 may facilitate the circulation of drilling fluids during drilling operations, the flow of hydrocarbon production ("production") (e.g., oil and gas) from the reservoir to the surface during production operations, the injection of substances (e.g., water) into the formation 170 or the during injection operations, or the communication of monitoring devices (e.g., logging tools) into the formation 170 or the reservoir during monitoring operations (e.g., during in situ logging operations).

In some embodiments, the sensor node system 150 includes casing installed in the wellbore 190. For example, the wellbore 190 may have a cased portion and an uncased (or "open-hole") portion. The cased portion may include a portion of the wellbore having casing (e.g., casing pipe and casing cement) disposed therein. The uncased portion may include a portion of the wellbore not having casing disposed therein. In some embodiments, the casing includes an annular casing that lines the wall of the wellbore 190 to define a central passage that provides a conduit for the transport of tools and substances through the wellbore 190. For example, the central passage may provide a conduit for lowering logging tools into the wellbore 190, a conduit for the flow of production (e.g., oil and gas) from the reservoir to the surface, or a conduit for the flow of injection substances (e.g., water) from the surface into the formation 170. In some embodiments, the sensor node system 150 includes production tubing installed in the wellbore 190. The production tubing may provide a conduit for the transport of tools and substances through the wellbore 190. The production tubing may provide a conduit for the transport of tools such as the base station anchor 180. The production tubing may, for example, be disposed inside casing.

Keeping with FIG. 1, in some embodiments, the sensor node system 150 includes sensor node devices 160 injected into the fracture through the wellbore 190. The sensor node devices 160 may be hardware and software configured for exchanging wireless communications within the formation 170. The sensor node devices 160 may be distributed into the fracture through the injection process. Accordingly, the sensor node devices 160 may be located anywhere in the formation 170 at any given time. The sensor node devices 160 may exchange wireless communications (represented by double sided arrows) with each other and with other wireless devices within a range of transmission. For example, the base station anchor 180 located at the wellbore 190 may be configured to receive transmissions from the sensor node devices 160. More specifically, the sensor node devices 160 are configured to sense data and send it to the base station; subsequently, the base station sends the data to the processing computer for further processing.

In some embodiments, the sensor node system 150 includes the base station anchor 180 placed into the wellbore 190. The base station anchor 180 may be hardware and software configured for exchanging wireless communications within the formation 170. The base station anchor 180 may be distributed into the wellbore 190 before the completion process of the well. As such, the base station anchor 180 does not enter the formation 170 during production, but remains in the wellbore 190 after drilling of the well. In this regard, the base station anchor 180 may be extracted from the wellbore 190 after completing a mapping of the formation 170. The base station anchor 180 may be deliberately located near a perceived bottom of the formation 170. The perceived bottom of the formation 170 may be determined during drilling or surveying before drilling of the well. Further, the perceived bottom of the formation 170 may be identified after drilling of the well. The base station anchor 180 may exchange wireless communications (not shown) with other wireless devices within a range of transmission. For example, a device located at the wellbore 190 and the sensor node devices 160 may be configured to exchange information with the base station anchor 180.

In one or more embodiments, the base station anchor 180 may be a large dipole antenna inside the wellbore 190. As such, a communication link exchanging information in real-time may be established with the sensor node devices 160 inside the fracture. The information from the sensor node devices 160 may be transmitted to the base station anchor 180 via a multi-hop technique over the communication link established among the sensor node devices 160.

Keeping with FIG. 1, in some embodiments, the well surface system 120 includes a surface sensing system 122. The surface sensing system 122 may include sensors for sensing characteristics of substances, including production, passing through or otherwise located in the well surface system 120. The characteristics may include, for example, pressure, temperature and flow rate of production flowing through a wellhead of the well, or other conduits of the well surface system 120, after exiting the wellbore 190.

In some embodiments, the surface sensing system 122 includes a surface pressure sensor operable to sense the pressure of production flowing through the well surface system 120, after it exits the wellbore 190. The surface temperature sensor may include, for example, a wellhead temperature sensor that senses a temperature of production flowing through or otherwise located in the wellhead, referred to as "wellhead temperature" ($T_{wh}$). In some embodiments, the surface sensing system 122 includes a flow rate sensor operable to sense the flow rate of production flowing through the well surface system 120, after it exits the wellbore 190. The flow rate sensor may include hardware that senses a flow rate of production ($Q_{wh}$) passing through the wellhead.

In some embodiments, the well system includes a reservoir simulator 140. For example, the reservoir simulator 140 may include hardware and/or software with functionality for generating one or more reservoir models regarding the formation 170 and/or performing one or more reservoir simulations. For example, the reservoir simulator 140 may store initial network maps, a base station anchor location, sensor node device locations, updated network maps, and data regarding RMFS measurements and location references. Further, the reservoir simulator 140 may store well logs and data regarding core samples for performing simulations. The reservoir simulator 140 may further analyze initial network maps for the sensor node devices, the base station anchor location, the sensor node device locations, updated network maps, RMFS measurement data, location reference data, and/or other types of data to generate and/or update the one or more reservoir models. While the reservoir simulator 140 is shown at the well site, embodiments are contemplated where reservoir simulators are located away from well site. In some embodiments, the reservoir simulator 140 may include a computer system that is similar to the computer system 1700 described below with regard to FIG. 17 and the accompanying description.

In some embodiments, the reservoir simulator 140 may maintain a constant feed of RMFS measurements from the MI-based communication exchanges between the sensor node devices 160. As the sensor node devices 160 are randomly deployed in reservoir fractures, the locations of the sensor node devices 160 may be initially considered to be unknown. Further, as the base station anchor 180 are deliberately placed, the locations of the base station anchor 180 may be considered as a reference point for an entire localization framework. For example, the base station anchor 180 may expand and ground the communication link formed by the sensor node devices 160. As such, the entire localization framework may increase by tracking induction between a transmitter coil antenna and a receiver coil antenna of any two sensor node devices 160, a sensor node device and a base station anchor.

In one or more embodiments, the reservoir simulator 140 may use the RMFS measurements and the various reference locations (i.e., known locations in the reservoir) to approximate an exact location of the sensor node devices 160 at all times of the injection process and after the sensor node devices 160 have stopped moving in the fracture. As a result, a network map may be created including the exact location of each sensor node device injected in the fracture.

In one or more embodiments, the reservoir simulator 140 may use the RMFS measurement values and the various reference locations in a distance approximation algorithm (or "scheme") and a 3D triangulation algorithm to determine an approximate location of the sensor node devices 160 in the reservoir. For example, the reservoir simulator 140 may evaluate the RMFS measurement values to estimate distances between sensor node devices 160 and the reference locations and between sensor node device pairs. The various reference locations may be known base station anchor locations from the wellbore 190 such that an initial network map may be generated including the exact location of each base station anchor. Sensor node device pairs may be neighboring sensor node devices 160 capable of communication exchanges with one another through the communication link, these exchanges may be limited only by the computational capacities of the system. As such, to determine the approximate location of the sensor node devices 160 in the reservoir, the reservoir simulator 140 may seek to estimate distances from the base station anchor 180 to the sensor node devices 160 with the highest RMFS values. Once these distances are estimated, the reservoir simulator 140 may verify the estimated distances by calculating locations in the reservoir for each sensor node device with respect to the base station anchor 180.

In one or more embodiments, the reservoir simulator 140 may use the approximate locations of each sensor node device and the location of the closest reference locations to each sensor node device in a multi-maps merging algorithm to identify the exact location of each sensor node device and for generating a final network map of the reservoir. For example, the reservoir simulator 140 may generate an updated version of the initial network map for each sensor node device distance that has been verified. Once all of the sensor node devices 160 have a corresponding updated network map, the reservoir simulator 140 may combine all of the updated network maps to generate a final network map. While generating the updated network maps, certain sensor node device locations may be verified more than once. As a result, in subsequent upgraded network maps, these sensor node device locations may be used as new reference locations such that computational power may be reduced progressively the more sensor node device locations are verified.

While FIG. 1 shows various configurations of components, other configurations may be used without departing from the scope of the disclosure. For example, various components in FIG. 1 may be combined to create a single component. As another example, the functionality performed by a single component may be performed by two or more components.

Figure 2A:
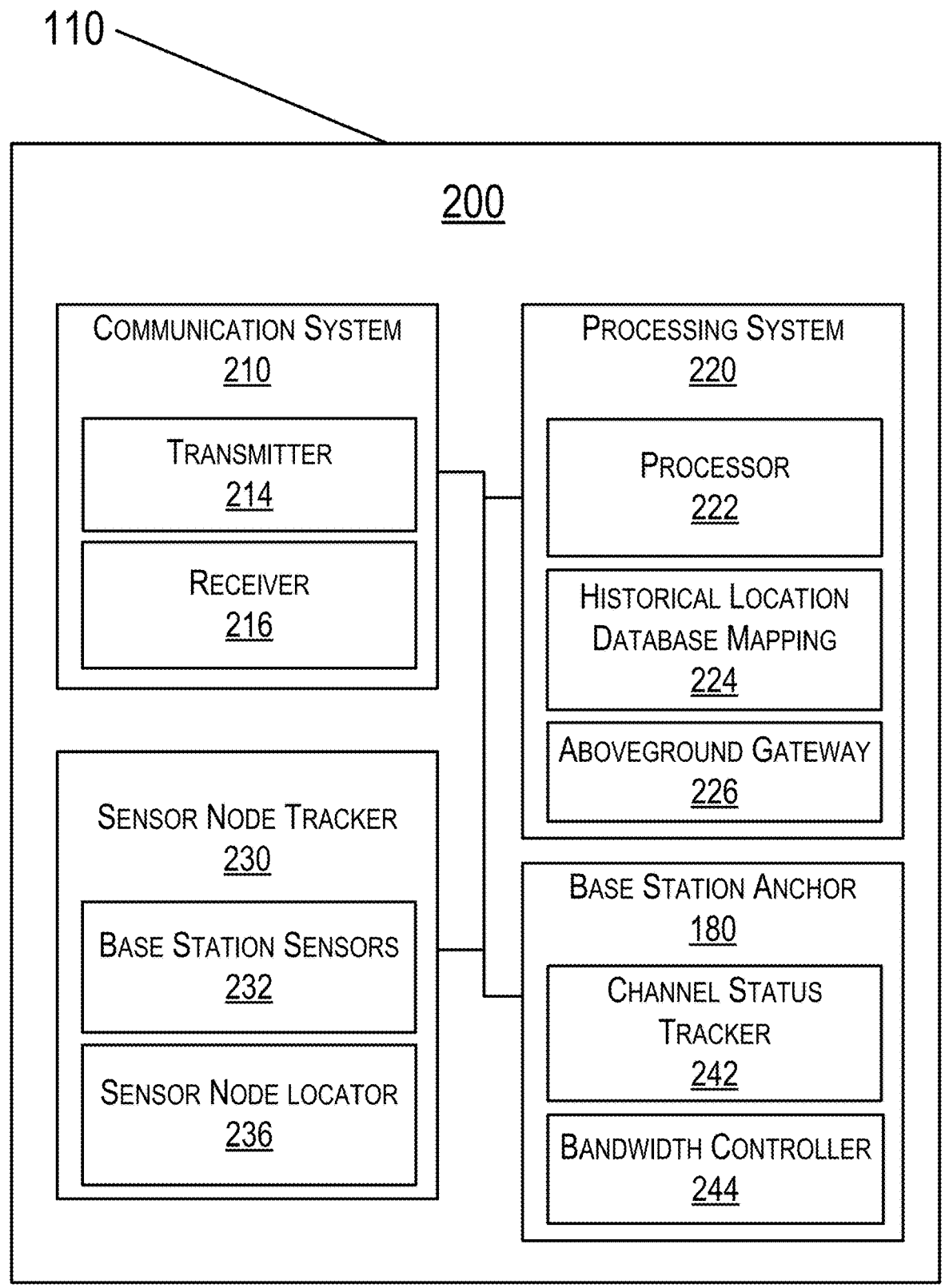
FIG. 2A shows a schematic diagram representative of a base station in accordance with one or more embodiments.

FIG. 2A shows a schematic diagram illustrating various systems disposed in the base station 110. In some embodiments, the base station 110 is located at a distance from the wellhead. The base station 110 may be defined by a housing 200 rated for use in hazardous environments. During completion operations, the base station 110 may start autonomously upon detecting a triggering condition. The triggering condition may a result from comparing predetermined well site properties with a specific set of data collected by one or more systems of the base station 110. In this regard, well site monitoring performed by the base station 110 may be automatically activated upon identifying that the predetermined well site properties have been met. These well site properties may include information relating to changes in the well site.

In some embodiments, the base station 110 is completely enclosed in the housing 200 containing a communication system 210, a processing system 220, a sensor node tracker 230, and a base station anchor 180. The communication system 210 may include communication devices such as a transmitter 214, and a receiver 216. The transmitter 214 may transmit and the receiver 216 may receive communication signals. Specifically, the transmitter 214 and the receiver 216 may communicate with one or more control systems located at a remote location. The transmitter 214 and the receiver 216 may communicate wirelessly using a wide range of frequencies and by establishing multiple communication links with multiple sensor node devices 160. In some embodiments, high or ultrahigh frequencies (i.e., between 10 KHz to 10 GHz) may be implemented. The transmitter 214 and the receiver 216 may exchange signals with a predetermined geotag indicating the physical location of the base station 110.

The processing system 220 may include a processor 222, a historical location database mapping 224, and an aboveground gateway 226. The aboveground gateway 226 may include a power supply such as a battery or wired connection for providing electrical energy to the base station 110. In some embodiments, a battery is charged using electrical connectors (not shown). The processor 222 may perform computational processes simultaneously and/or sequentially. The processor 222 may determine information to be transmitted and processes to be performed using information received or collected. Similarly, the processor 222 may control collection and exchange of geospatial information through the transmitter 214 and the receiver 216. The historical location database mapping 224 may provide location tags to each signal received from the sensor node devices 160 in the formation and it may store these tags over a period of time. As new tags are provides for newly activated sensor node devices 160, the historical location database mapping 224 uses previously stored data to predict strength connections associated to the current location of the newly deployed sensor node devices 160. The aboveground gateway 226 may be hardware and software configured to allow data to flow from one discrete network including the base station 110. The aboveground gateway 226 may implement one or more communication protocols simultaneously.

The sensor node tracker 230 may include base station sensors 232 and sensor node locator 236. The base station sensors 232 may be sensors that collect physical data from the environment surrounding the base station 110 (i.e., the weather surrounding the well site). The base station sensors 232 may be sensors that collect physical data from the base station 110 itself (i.e., internal temperature, internal pressure, or internal humidity). The base station sensors 232 may be lightweight sensors requiring a small footprint. These sensors may monitor a status of the communication links established with the base station 110 during tracking operations. These sensors may exchange information with each other and supply it to the processor 222 for analysis. The sensor node locator 236 may be a logging tool of an electrical type that establishes communication links with one or more additional sensor node devices 160 disposed on the formation 170. The sensor node locator 236 may identify trends, characteristics or properties (i.e., such as pressure or temperature changes) relating to the movement of the sensor node devices 160 in relation to the base station 110. The sensor node locator 236 may stabilize communications associated with the transmitter 214 and the receiver 216 by preventing magnetic interference between the transmitter 214 and the receiver 216 and the rest of the sensor node devices 160. The aboveground gateway 226 may be operationally connected to the sensor node locator 236 and including connections (not shown) for collecting energy and producing electrical energy as a result.

The base station anchor 180 may include a channel status tracker 242 and a bandwidth controller 244. The channel status tracker 242 may include peripherals associated with hydrocarbon production to maintain a MI channel connection with multiple electronic devices. The bandwidth controller 244 may be hardware and software mechanisms that identify and track the positioning of the communication links established by the node sensor devices 160 with respect to the base station 110.

In one or more embodiments, the base station 110 may perform a one-hop radiative energy charging stage in which the base station 110 radiates energy into the formation 170 and communicates with the sensor node devices 160. The base station 110 may perform multi-hop MI-communications stage in which the sensor node devices 160 use the MI-communication mechanism to transmit the sensed data to the nearest neighboring sensor node device 160, and by consecutive relaying, the multi-hop transmission route may be used to transmit the data back to the base station 110. The sensor node devices 160 may not have a self-power source. Instead, the sensor node devices 160 may harvest energy from the electromagnetic radiation generated by the base station 110. In this regard, the sensor node devices 160 may not operate until they collect sufficient energy.

The base station 110 may receive sensed data from the sensor node devices 160 in the fractures and then may forward the data through the aboveground gateway 226 to one or more additional devices communicating with the base station 110 (i.e., the control system 130).

In one or more embodiments, the base station 110 may provide a downlink energy charge that operates in a one-hope fashion to charge the entire senso node system 150. Because the fracture is extremely narrow, the size of the sensor node devices 160 is extremely small, which limits battery capacity. Consequently, a small battery may not store enough power for the sensor node devices 160 to perform communication and sensing functionalities. As a result, the battery may be replaced by an ultra-capacitor to store harvested energy for the sensor node device operations. In this regard, energy charging and a consumption model may be implemented to increase the capacity of the sensor node device 160 to transmit sensed data that depends on the amount of harvested energy.

Figure 2B:
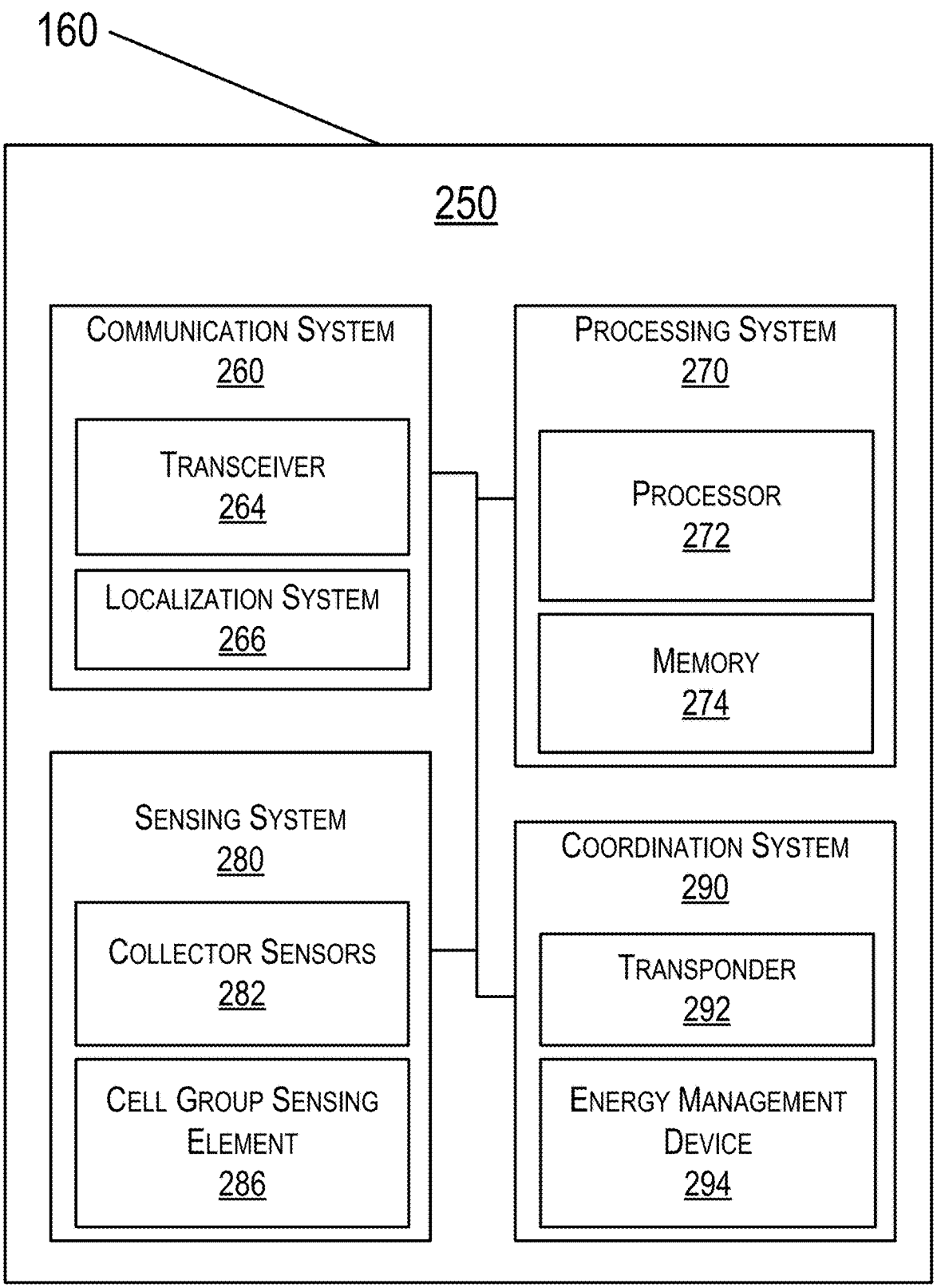
FIG. 2B shows a schematic diagram representative of a sensor node device in accordance with one or more embodiments.

FIG. 2B shows a schematic diagram illustrating various systems disposed in a sensor node device 160. In some embodiments, the sensor node device 160 is located in the formation 170. The sensor node device 160 may be defined by a housing 250 rated for use in hazardous environments. During production operations, the sensor node device 160 may start autonomously upon detecting a triggering condition. The triggering condition may a result from comparing predetermined formation properties with a specific set of data collected by one or more systems of the sensor node device 160. In this regard, the sensor node device 160 may be automatically activated upon identifying that the predetermined formation properties have been met. These formation properties may include information relating to changes in the pressure of the formation.

Upon activation, the sensor node device 160 may monitor its surroundings using hardware and software configured to track physical phenomena outside the housing 250 (i.e., temperature, pressure, viscosity of the fluid surrounding the sensor node device 160) and to track physical phenomena inside the housing 250 (i.e., internal temperature or communication link status with the base station 110). The sensor node device 160 may implement the monitoring processes upon activation of the sensor node device 160. The activation may be triggered based on a triggering condition. Advantageously, the triggering condition may be a predetermined condition or a real-time condition identified based on information obtained by the sensor node device 160. In one or more embodiments, the sensor node device 160 monitors physical phenomena to map hydraulic fractures in the formation 170.

In one or more embodiments, the monitoring of hydraulic fractures and unconventional oil and gas reservoirs are crucial for determining the rich venue of oil and natural gas reserves. To be disposed in hydraulic fractures, the housing 250 is set up to overcome limitations caused by harsh environmental conditions and energy constraints. As it will be explained bellow, the sensor node device 160 provides a MI-based wireless sensor node to be used as a platform for a new generation of WUSNs for monitoring hydraulic fractures, unconventional reservoirs, and measuring other wellbore parameters. The sensor node device 160 include short range communication devices using NFC technology as a physical layer combined with an energy harvesting capability and ultra-low power requirements.

In some embodiments, the sensor node device 160 is completely enclosed in the housing 250 containing a communication system 260, a processing system 270, a sensing system 280, and a coordination system 290. The communication system 260 may include communication devices such as a transceiver 264, and a localization system 266. The transceiver 264 may transmit and receive communication signals. Specifically, the transceiver 264 may communicate with one or more control systems located at a remote location. The transceiver 264 may communicate wirelessly using a wide range of frequencies and by establishing multiple communication links. In some embodiments, high or ultrahigh frequencies (i.e., between 10 KHz to 10 GHz) may be implemented. The localization system 266 may include one or more geospatial location identification components that collect information associated with hydraulic fractures to be reported to the base station 110.

The processing system 270 may include a processor 272 and a memory 274. The processor 272 may perform computational processes simultaneously and/or sequentially. The processor 272 may determine information to be transmitted and processes to be performed using information received or collected. Similarly, the processor 272 may control collection and exchange of geospatial information through the localization system 266.

As noted above, the processor 272 may perform real-time analysis of the casing during the production operations in real-time. The processor 272 may generate at least one parameter that may be used in a reservoir simulation. The reservoir simulations may be processed in association with a tracking engine that will be explained in more detail with respect to FIG. 3. The processor 272 may compare a status of hydraulic fractures in the formation 170 with multiple predetermined formation properties. The multiple predetermined formation properties may include several parameters associated with previously performed reservoir simulations. The processor 272 may trigger the triggering condition when the status of the sensor node device 160 equals a status indicative of at least one formation property out of the multiple predetermined formation properties. Further, the memory 274 may store the status of the sensor node device 160 by indexing the one or more formation properties identified.

The sensing system 280 may include collector sensors 282 and a cell group sensing element 286. The collector sensors 282 may be sensors that collect physical data from the environment surrounding the sensor node device 160 (i.e., the rock formation and/or the surface). The collector sensors 282 may be sensors that collect physical data from the sensor node device 160 itself (i.e., internal temperature, internal pressure, or internal humidity). The collector sensors 282 may be lightweight sensors requiring a small footprint. These sensors may monitor a status of the hydrocarbon fractures during the mapping operations. These sensors may exchange information with each other and supply it to the processor 272 for analysis. The cell group sensing element 286 may be a logging tool of an electrical type that establishes communication links with one or more additional devices disposed on the surface or at a remote location. The cell group sensing element 286 may identify trends, characteristics or properties (i.e., such as pressure or temperature changes) relating to the movement of the sensor node device 160 in relation to the base station 110. The cell group sensing element 286 may stabilize communications associated with the transceiver 264 by preventing magnetic interference between the transceiver 264 and the rest of the sensor node device 160.

The coordination system 290 may include a transponder 292 and an energy management device 294. The transponder 292 may be used for mapping hydraulic fractures and reservoir parameters must be able to physically fit into, not just simply adjacent, to fracture, at a considerable depth. In some embodiments, a complete mapping of hydrocarbon fractures require a transmission range on the order of 100 meters.

In one or more embodiments, the sensor node devices 160 allow two-way communication between node sensor devices 160 in order to distribute information such as routing sensor node device data to the base station 110. The transceiver 264 may work in NFC and feature received signal strength indication (RSSI) as well as enable multi-transponders interfaces. The transponder 292 may receive the sensor node device data and feature dual connection interfaces with the memory 274 and an antenna.

Figure 3:
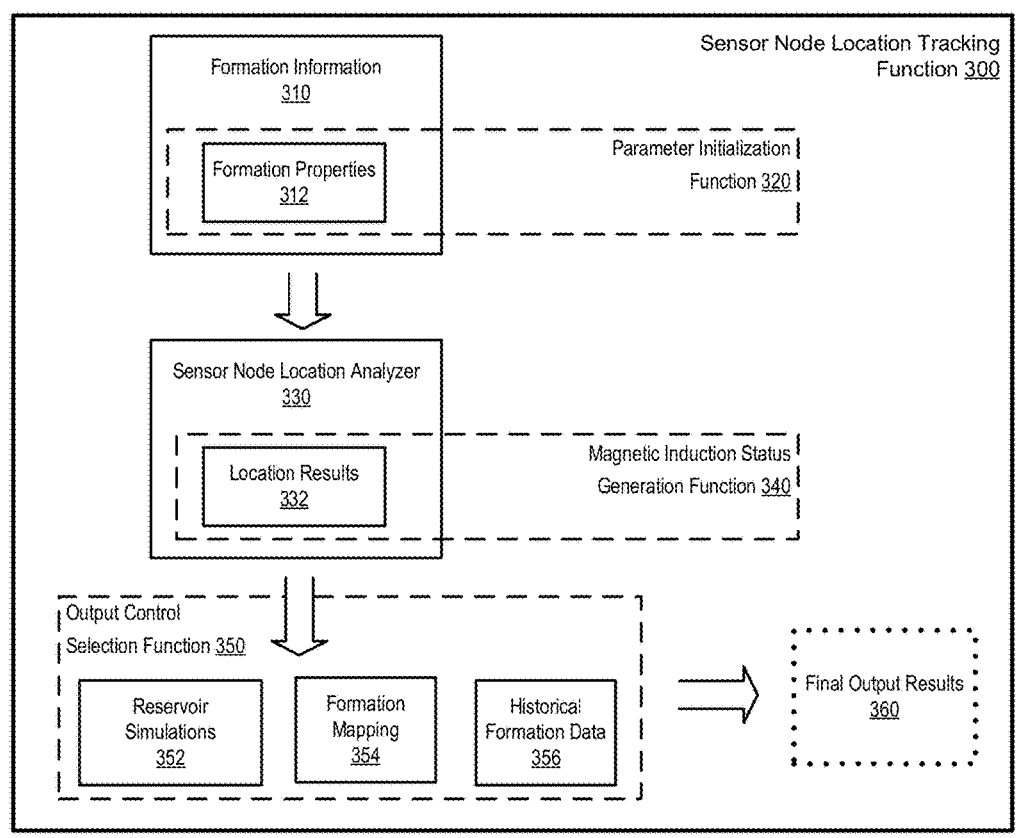
FIG. 3 shows a schematic diagram of a method for mapping hydraulic fractures in accordance with one or more embodiments.

FIG. 3 illustrates a successive flow of parameters implemented in mapping hydraulic fractures using the sensor node system 150 through a sensor location tracking function 300. The sensor location tracking function 300 may be hardware and/or software configured to monitor one or more conditions in the hydraulic fractures of the hydrocarbon well. In FIG. 3, the sensor location tracking function 300 may be implemented by one or more devices described in reference to numerals 100, 110, and 160 of FIG. 1, or in reference to the computer system 1700 of FIG. 17. In some embodiments, the sensor location tracking function 300 identifies formation information 310 (i.e., formation structure information) including formation properties 312 for using in a parameter initialization function 320 of an area of interest. The area of interest is any formation portion or section of the formation 170 in which communication may be identified. In some embodiments, the method and the system perform periodic surveys to monitor an physical phenomena in the area of interest.

In the parameter initialization function 320, the parameters associated with the formation information 310 are selected based on their relevance. The parameter initialization function 320 may share processing with a magnetic induction status generation function 340, which controls a sensor node location analyzer 330 indicating multiple location results 332 in which an iterative loop determines a number of required location results from multiple sensor node devices 160. The iterative loop is a representation of the repetitive process to evaluate subsequent parameters based on the periodic surveys on the formation 170 until a final time of the iterations is reached. The final time may be controlled by hardware or software of the sensor location tracking function 300.

Once the sensor node location analyzer 330 processes the location results 332, an output control selection function 350 may perform processing of the initialized parameters to perform reservoir simulations 352, perform formation mapping 354, and update historical formation data 356. As a result, final output results 360 may be obtained for identifying the shape of the formation 170. To this end, the sensor location tracking function 300 may provide the possibility to generate decisions as to any parameters or conditions that may be relevant for performing reservoir simulations.

Figure 4A:
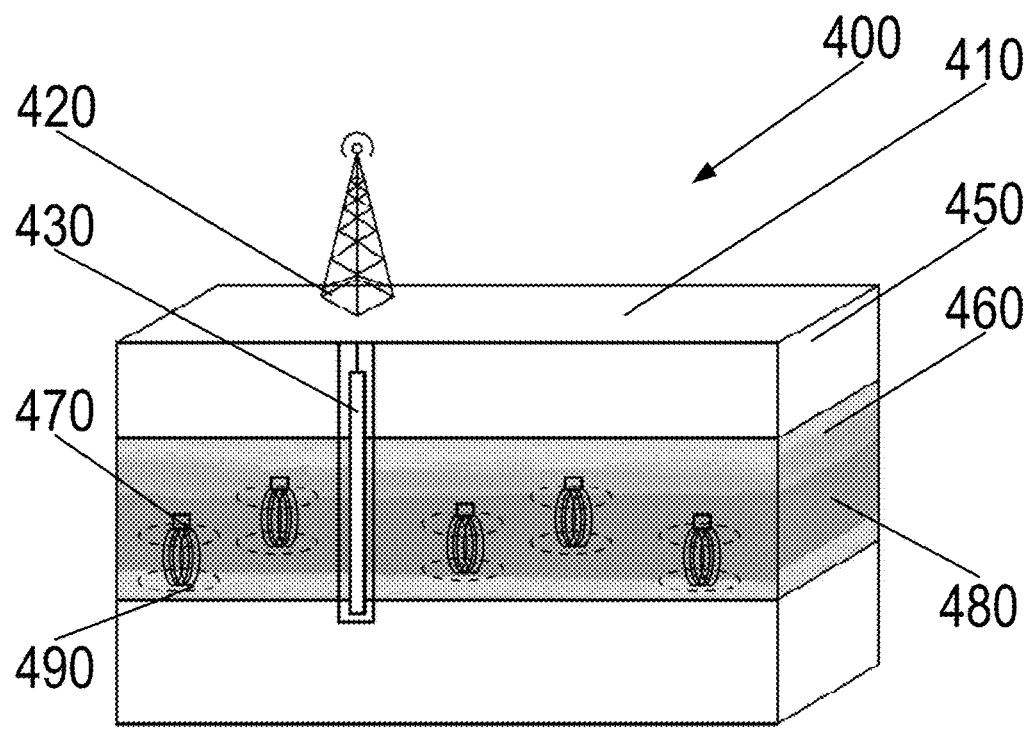
FIGS. 4A-4E show schematic diagrams of a method for mapping hydraulic fractures in accordance with one or more embodiments.
Figure 4B:
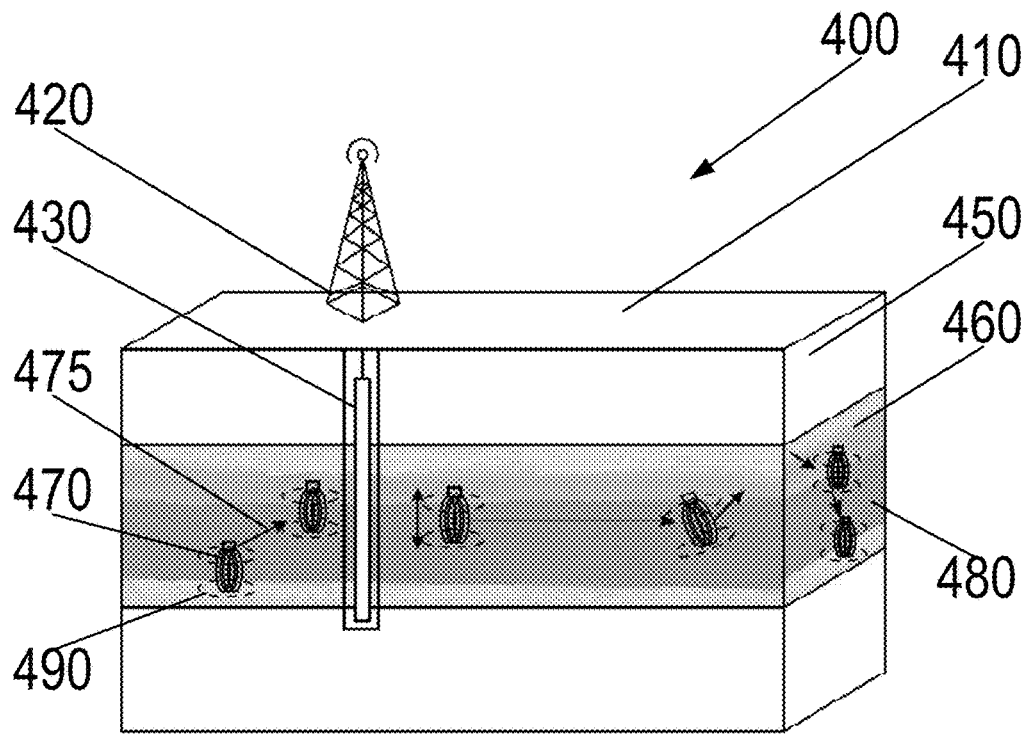

FIGS. 4A-4E show cross-section perspectives 450 of a well site in which a sensor node system 400 may be implemented. In some embodiments, the sensor node system includes a base station 420 including at least one base station anchor 430 and at least one sensor node device 470. In the sensor node system 400, the at least one base station anchor 430 are disposed in an area of interest 480 of a formation 460. In this regard, the area of interest 480 may be disposed at a distance from a well site surface 410. The sensor node device 470 may include an area of effect 490 which is the minimum distance required for exchanging signals with one or more additional sensor node devices. As shown in FIG. 4A, the sensor node device 470 may be distributed in the area of interest 480 so that the sensor node device 470 are evenly distributed in the formation 460. Subsequently, as shown in FIG. 4B, the sensor node device 470 may be exchange multiple signals 475 that interconnect each sensor node device 470. Multiple connections of sensor node devices may be connected continuously to form wireless circuits that effectively operate to maintain feedback throughout the sensor node devices in the wireless circuit.

Figure 4C:
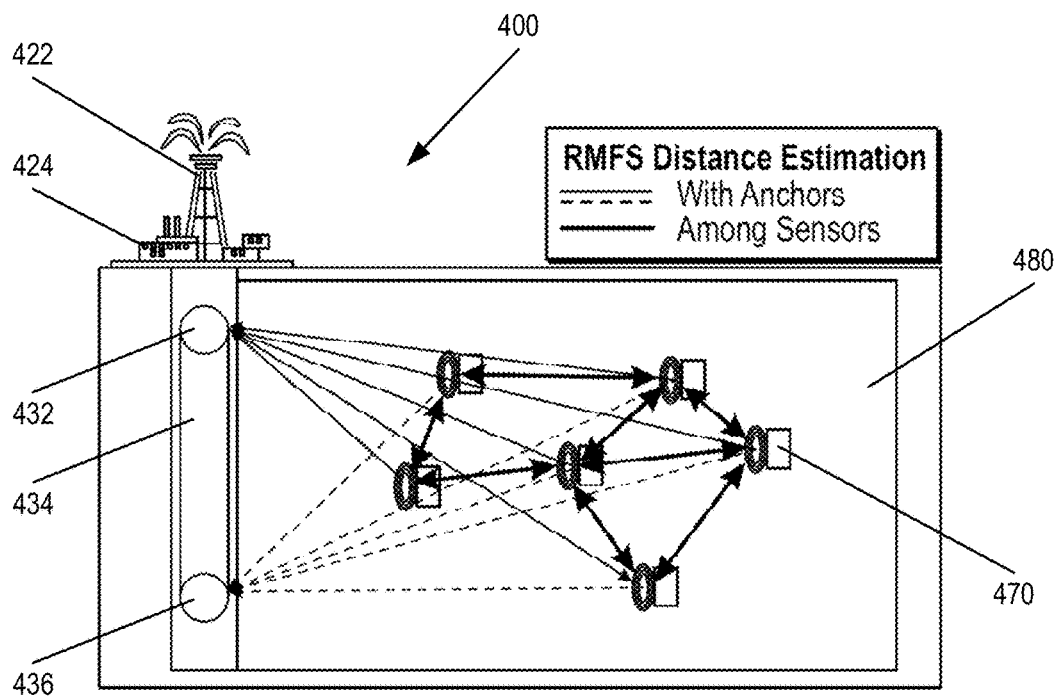
Figure 4D:
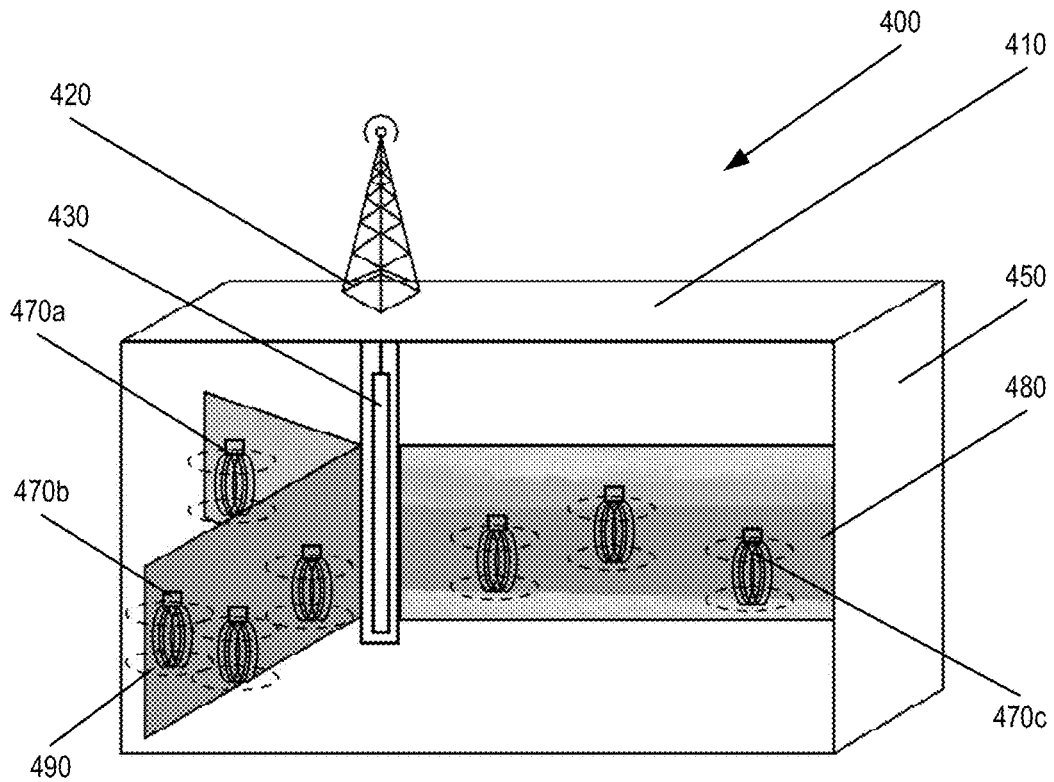
Figure 4E:
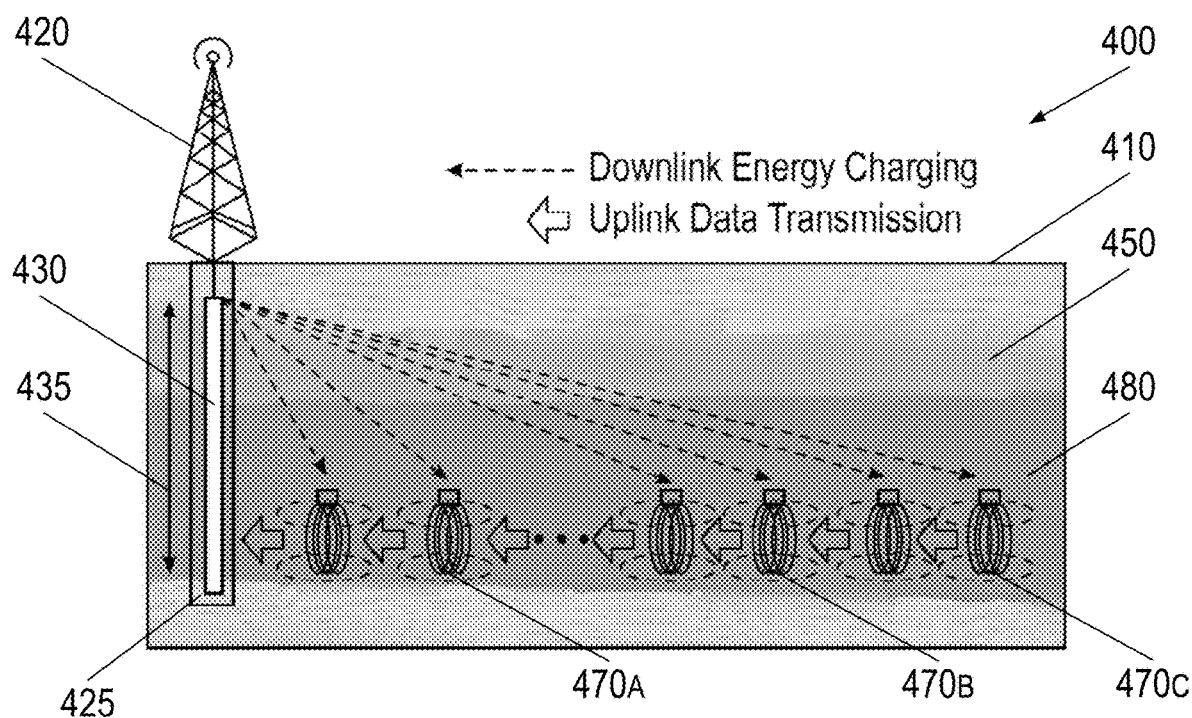

As shown in FIG. 4C, two anchors may be assumed to be inside a single drilling well. The sensor node devices may be randomly spread in the area of interest 480. The two anchors may be an upper anchor 432 and a lower anchor 436 disposed at each end of a large dipole antenna 434. The two anchors may have direct communication links to every sensor node device within its larger transmission range. FIG. 4D shows that multiple sensor node devices 470a, 470b, and 470c may be part of a three-dimensional space for the sensor node system 400. In FIG. 4E, the two anchors are interchanged along a depth 435 of the wellbore 425 while at least one of them maintains constant charging of the multiple sensor node devices 470a, 470b, and 470c. In this case, the constant charging is performed in a downlink exchange while data is transmitted in an uplink exchange from the multiple sensor node devices 470a, 470b, and 470c towards the base station 420.

Figure 5:
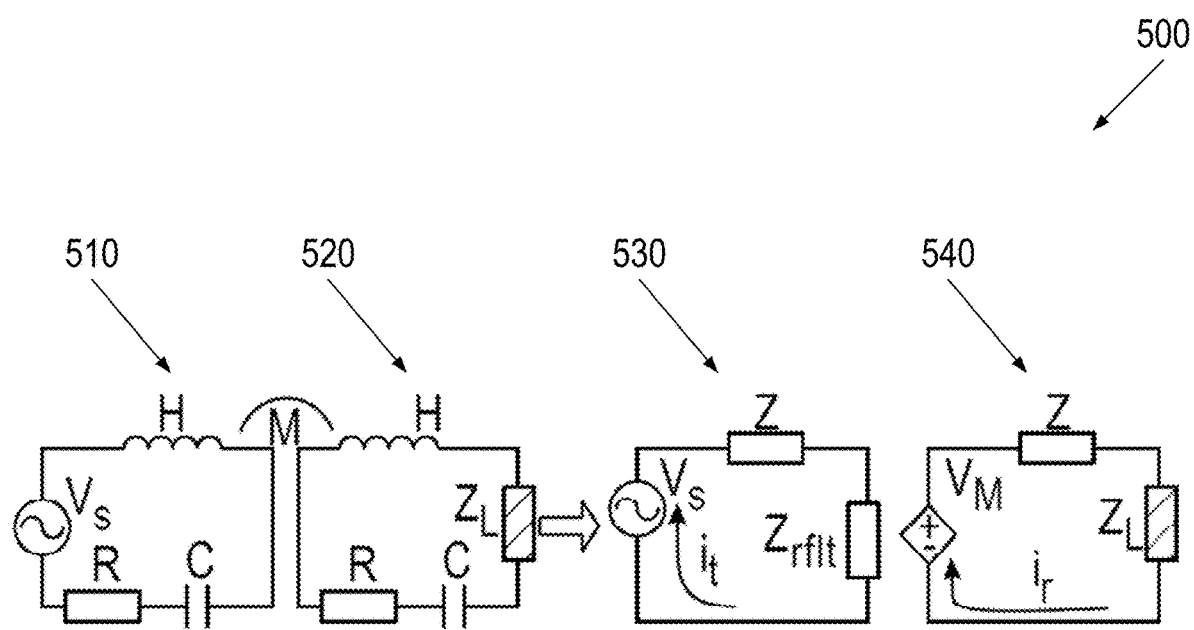
FIG. 5 shows a schematic diagram representative of a circuit for mapping hydraulic fractures in accordance with one or more embodiments.

FIG. 5 shows a wireless circuit 500 formed through peer-to-peer MI-based connections between sensor node devices. FIG. 5 illustrates a system model for MI-based communication over WUSNs in hydraulic fractures and oil reservoirs. The MI communication link may be formed by the induction between a primary coil 510 and a secondary coil 520. In FIG. 5, the wireless circuit 500 may include the primary coil 510 and the secondary coil 520 inversely contacting at least one first load 530 and a second load 540. The primary coil 510 and the secondary coil 520 may be an MI-transceiver that may be modeled as two transformers, where VS (voltage), ZL (load impedance of the receiver), M (mutual induction), R (resistance), H (self-induction of coil), and C (loaded capacitor).

Figure 6:
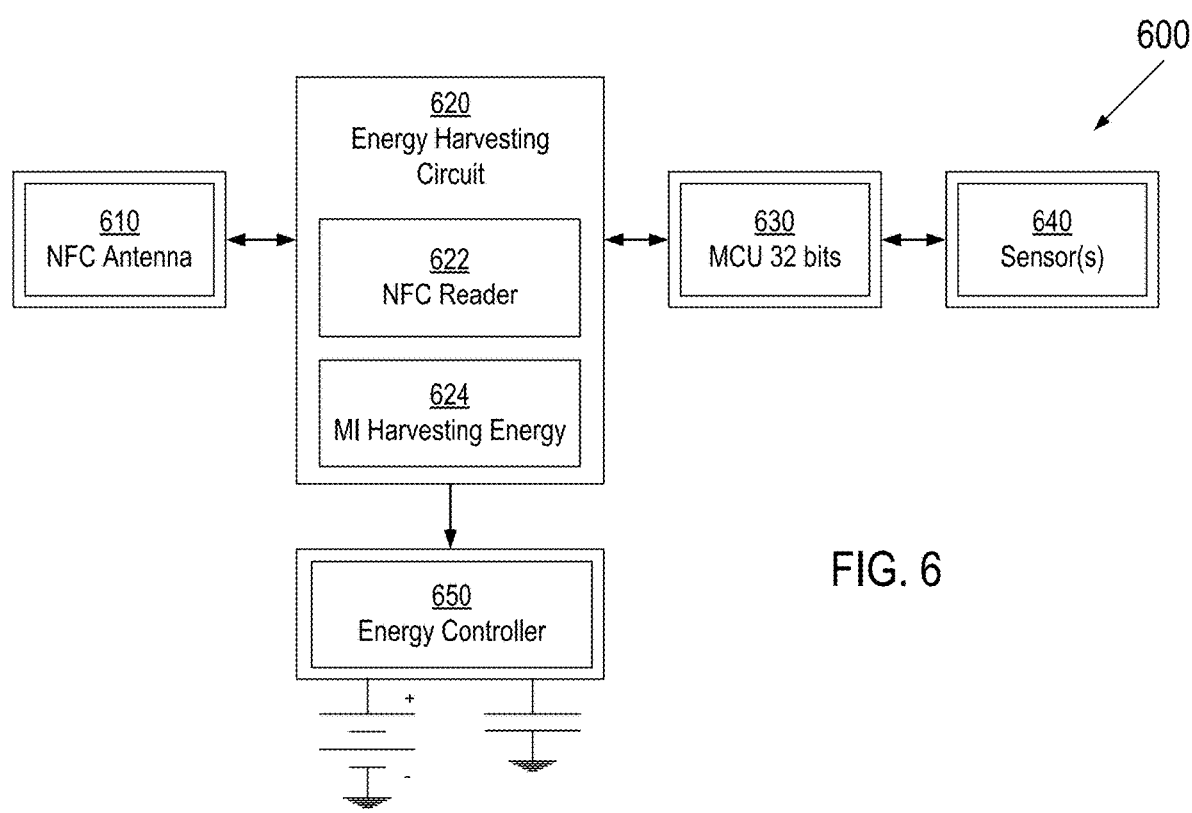
FIG. 6 shows a schematic diagram representative of a sensor node device in accordance with one or more embodiments.

FIG. 6 shows a schematic diagram representative of a sensor node architecture 600. The sensor node architecture 600 may be implemented using the hardware described in reference to FIG. 2B. The sensor node architecture 600 may be the sensor node device 160 or the sensor node device 470 developed to work in hydraulic fractures and oil reservoirs. The sensor node architecture 600 provides a unique communication layer, size, and energy source. Further, the sensor node device 160 or the sensor node device 470 may have a smaller size that may be used overcome limitations caused by harsh environmental conditions and energy constraints in hydraulic formations. The sensor node device 160 or the sensor node device 470 may include a long operation time, ultra-low power capabilities, efficient communication layer, and harvesting energy. FIG. 6 presents a functional diagram of the sensor node device 160 or the sensor node device 470 using ultra-low-power electronic and harvesting/storing energy features 650 associated with dual-NFC interface (i.e., active transceiver and passive NFC antenna 610). The diagram shows the interconnection block of the sensor node device, which may consist of a microcontroller (MCU) 630, a JTAG interface, an energy harvesting circuit 620 (e.g., NFC reader 622 and MI harvesting energy 624), a battery, at least one sensor 640 for temperature, pressure, and/or chemistry of the fluid in the hydrocarbon fracture. The sensor node architecture 600 may include an MI-transceiver may connect to the sensor node device 160 in a passive, active, or peer-to-peer mode.

In the sensor node architecture 600, the MCU 630 is newer, more capable, and faster than processors manufactured under MSP430FR5969 with 6-bit RISC CPU. In some embodiments, the MCU 630 is an STM32 with 32-bits RISC CPU ARM. This MCU 630 has very advanced low power modes. The very advanced low power modes may include an active mode of 76 µA/MHz (micro-Amperes per megahertz), a standby mode of 0.23 µA, an off mode of 0.02 µA. The very advanced low power modes may include low voltage from 1.6 V (Volts) to 3.6 V. The very advanced low power modes allow for the sensor node device to operate as described in reference to FIGS. 1-5. These operations were impossible to achieve using devices with low power characteristics of an active mode of 100 µA/MHz, a standby mode of 0.4 µA, an off mode of 0.02 µA, and low voltage from 1.8 to 3.6V. In accordance to some embodiments, the sensor node architecture 600 includes a battery in addition to a supercapacitor, which provides over a power supply with over twice the capacity and duration of those previously known in the art. The MCU 630 may have multiple interfaces for different type of sensors integration. In some embodiments, the sensor node architecture 600 includes a watchdog timer (WDT) that generates a variable and programmable interval time that can be controlled from 0.1 milliseconds to several hours. This is a configurable parameter that may be modified in accordance with a specific application or that may be changed in response to changes in environment that may be monitored.

Figure 7A:
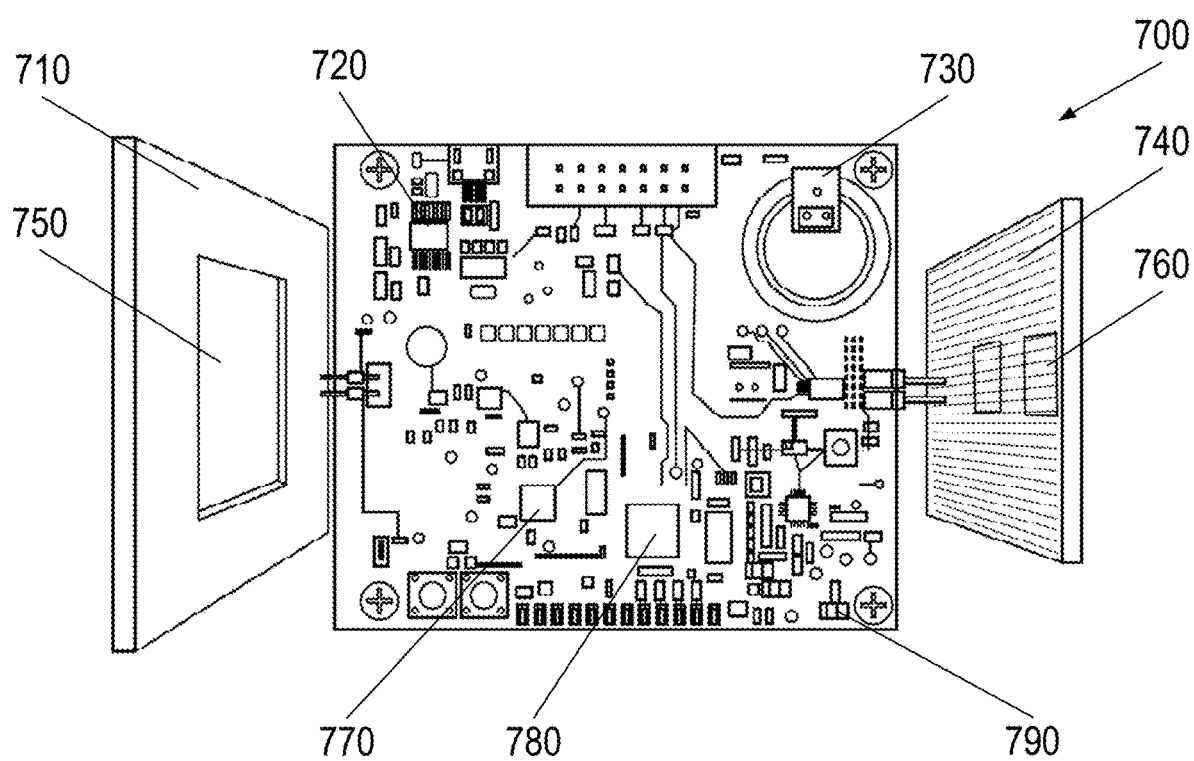
FIGS. 7A-7C show schematic diagrams representative of hardware implementations of a sensor node device in accordance with one or more embodiments.
Figure 7B:
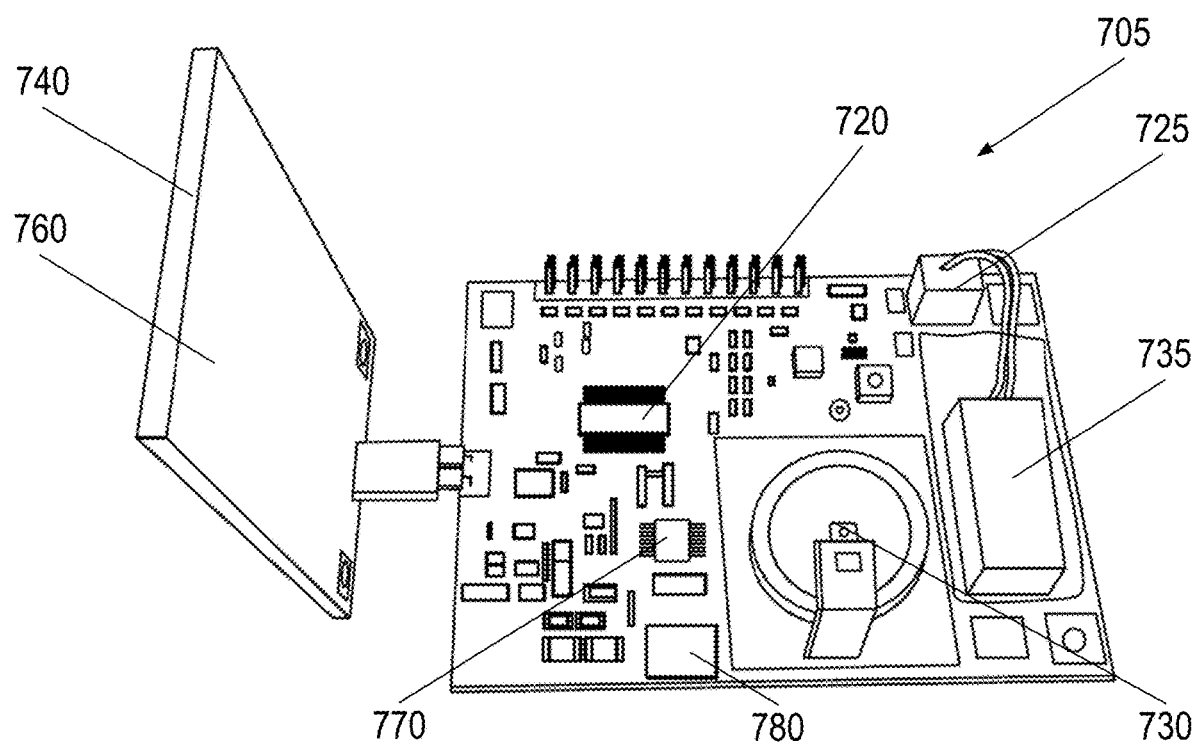
Figure 7C:
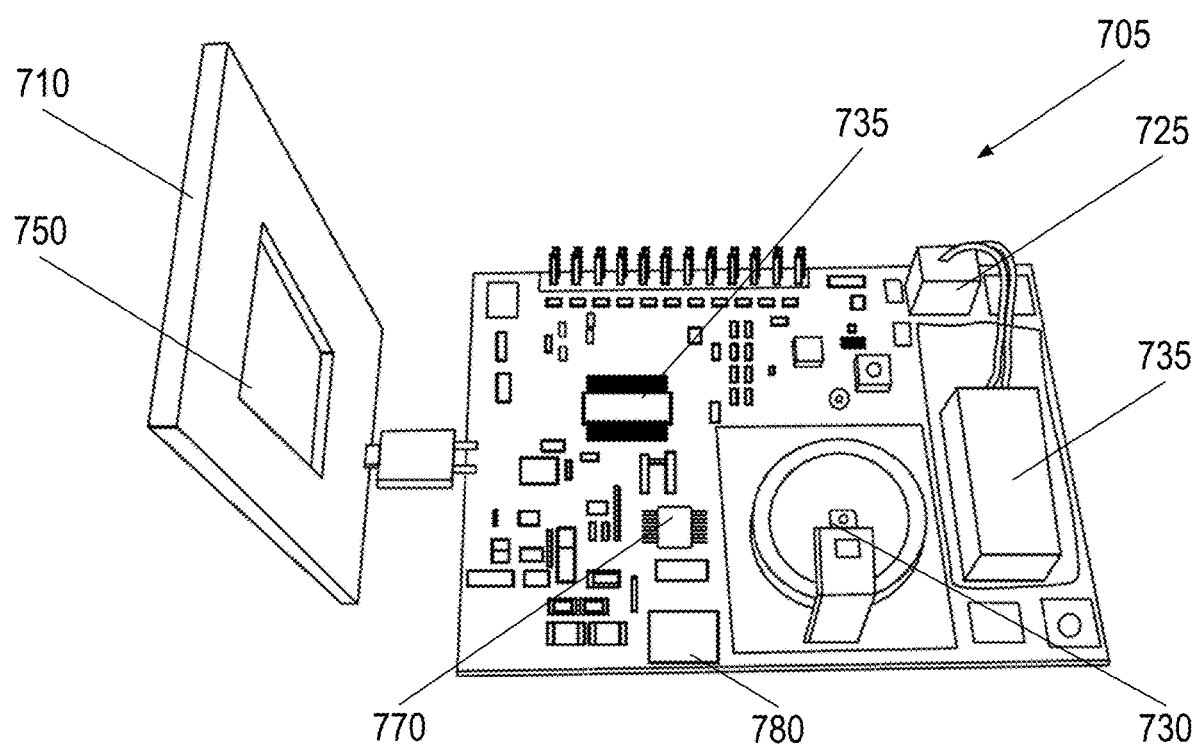

FIGS. 7A-7C show examples of hardware implementations of the sensor node device 160. The sensor node device 160 may be a full-size sensor node device 700 as shown in FIG. 7A or a half-size sensor node device 705 as shown in FIGS. 7B and 7C. FIGS. 7A-7C illustrate active sensor node devices 160, which consist of a microcontroller 780 with advanced low power modes, an energy management Unit (EMU) 720, a multi-sensor interface 790 such as temperature sensor, pressure, and/or chemistry, a dual NFC transceiver 770 (with an active interface 710 and a passive interface 740), and a super-capacitor or a rechargeable battery 730. The sensor node device 160 may feature the microcontroller 780 as a holistic ultra-low-power system architecture for low energy budgets. The enhanced features of the microcontroller 780 enable energy optimization through a low power mode (LPM). The advanced timer features allow microcontroller operations with minimal energy requirements during the sleep mode with an automatic wake-up system using the watchdog timer (WDT) working in interval mode. The WDT can generate a long interval time from milliseconds to hours, this time may be a configurable parameter in accordance with the environment which the sensor node device will be monitored. This feature allows the EMU 720 to store energy efficiently. In addition, during the LPM, the EMU 720 transfers 99.99% of the harvested energy to a rechargeable battery or supercapacitor 730.

The full-size sensor node device 700 may be a sensor node device with a dual NFC transceiver 770 with both an active interface 710 and a passive interface 740. The active interface 710 may include a through-hole connection 750 that allows an exchange (back and forth) of one or more electromagnetic signals between the sensor node device 160 and additional electronic devices surrounding the device. The passive interface 740 may include JTAGs 760 that enable the sensor node device to distinguish between multiple electromagnetic signals transmitted to the sensor node device 160. The half-size sensor device 705 may be a sensor node device with an NFC transceiver 770 with either a passive interface 740 with a JTAG panel 760 as shown in FIG. 7B or an active interface 710 with a through-hole connection 750 as shown in FIG. 7C. In addition, the half-size sensor device 705 may include additional harvesting connectors 725 to power a battery 735 in addition to the supercapacitor 730.

In one or more embodiments, the sensor node device 160 may be implemented at an active mode consumption of 76 µA/MHz, a standby mode consumption of 0.23 µA, an off mode consumption of 0.02 µA, and a low voltage consumption from 1.6 V to 3.6 V.

Figure 8:
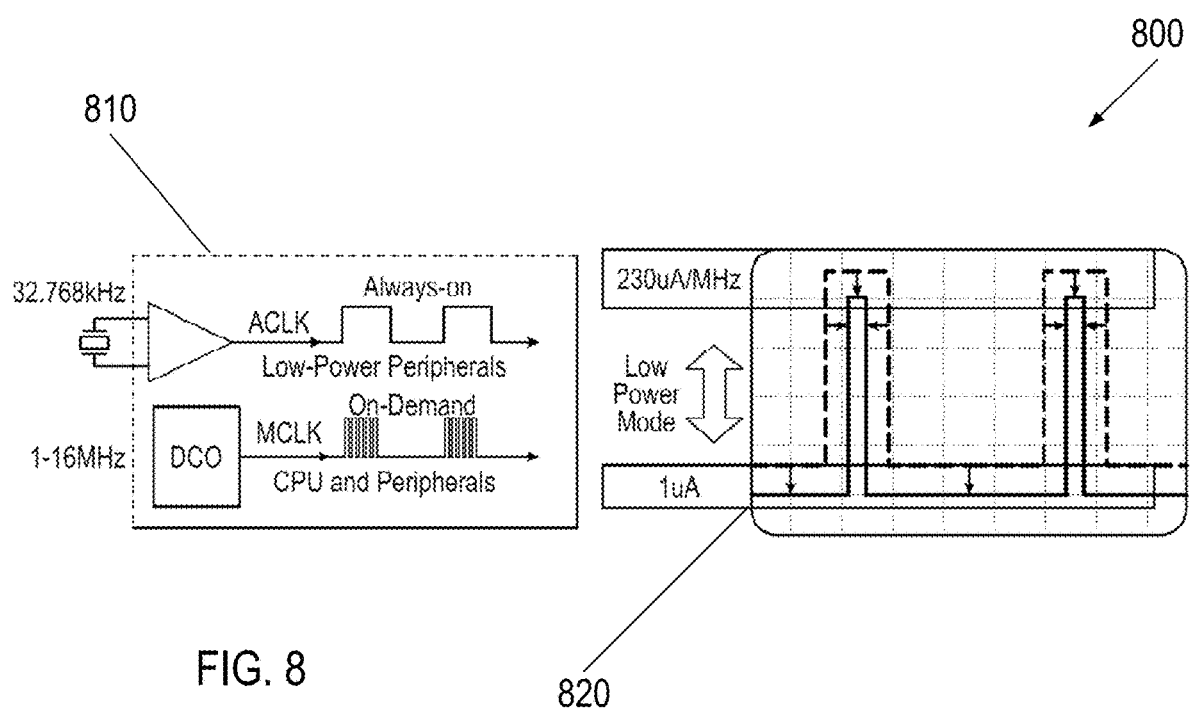
FIG. 8 shows a schematic diagram representative of a method for implementing an energy saving clock in accordance with one or more embodiments.

FIG. 8 shows a combination of clock controls 800 for performing energy-saving control operations. In FIG. 8, the combination of clock controls 800 may be implemented by the microcontroller 780. In combination of clock controls 800, the processing clock may be generated on block 810 by a 1 MHz digitally controlled oscillator (DCO) that turns off when the microcontroller 780 goes into low power mode as shown in block 820, but the 32.768 KHz (kilohertz) low-frequency clock remains online and generates a new wake up event every eight seconds. In this approach, the microcontroller 780 may reduce energy consumption to less than 1 micro-Ampere during the sleep mode interval.

Figure 9:
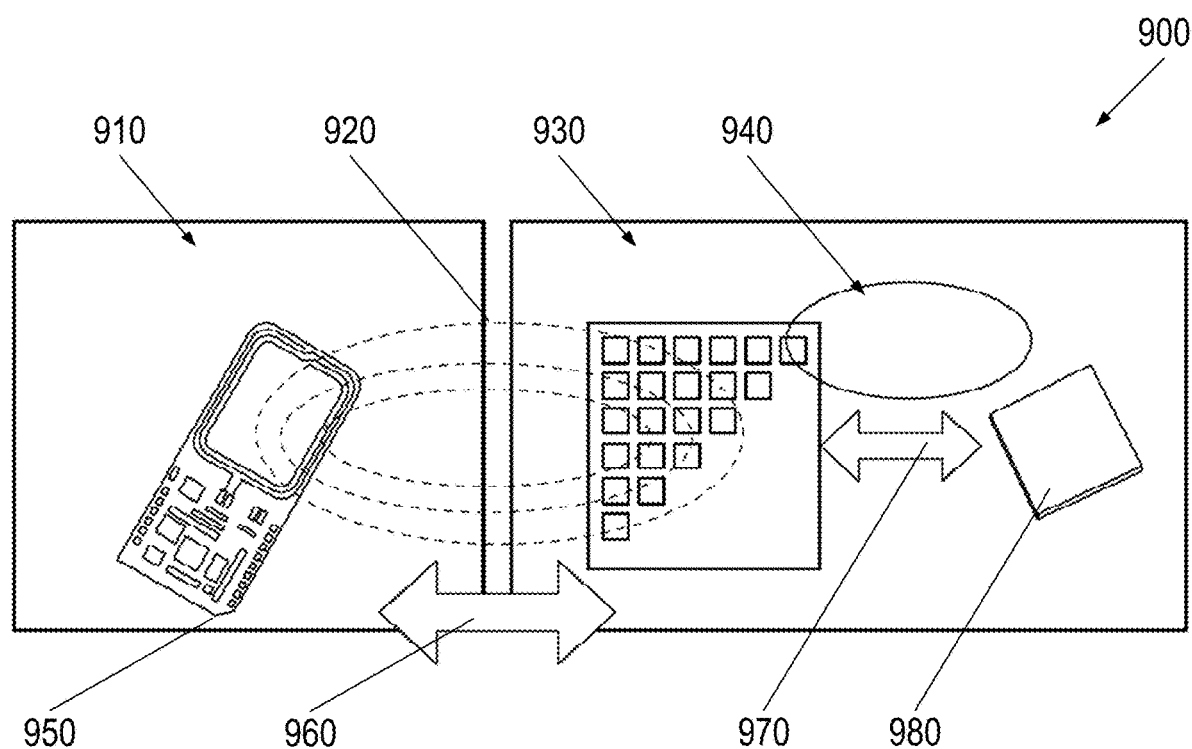
FIG. 9 shows a schematic diagram representative of a method for dual-interfacing a memory in accordance with one or more embodiments.

FIG. 9 shows an arrangement 900 of an NFC with a dual-interface memory. The arrangement 900 may include an RFID transceiver 910 with an antenna terminal 950 connected to a passive sensor 930 through magnetic induction 960 and other wireless signals 920. The passive sensor 930 may be coupled to a microcontroller 980 through an I2C communication interface while sharing a common memory block 940. The dual NFC communication may consist of two interfaces which are a combination of passive interfaces and active interfaces. In the arrangement 900, the sensor node device 160 is composed of dual NFC interfaces, including a transceiver and a transponder. The NFC transceiver enables access from one node to a neighboring node and transfer the sensor data such as temperature readings, pressure and chemistry readings and sensor status data such as connection statistics and battery/capacitor voltage. The node works as a mesh network, allowing node to collect the surrounding sensing data of neighboring nodes and to store all temperature readings and sensor parameters in an active tag. The NFC transceiver may include a received signal strength indicator (RSSI), which enables the communication, detection, and position estimation of the status of the sensor nodes devices 160. Further, the transponder may be based on a dual-interface memory chip that can be accessed by I2C and through the NFC interface. The chip allows the transceiver to read, write, and store data in the memory. The NFC tag allows the transceiver to access the neighboring nodes and collect the stored data independent of their energy status because the NFC interface provides the required energy from the radiated power.

In one or more embodiments, there is large difference in the power consumption by the microcontroller 780 and the NFC transceiver 770. The microcontroller 780 consumes over 70 times of the power consumed by the NFC transceiver 770. In this regard, the measured current for the microcontroller 780 operating in maximum clock is 1.8 mA (milli-Ampere) while the one of the NFC transceiver 770 working at power output of 20 dBm (decibels in relation to 1 milliwatt) is 114 mA.

Figure 10:
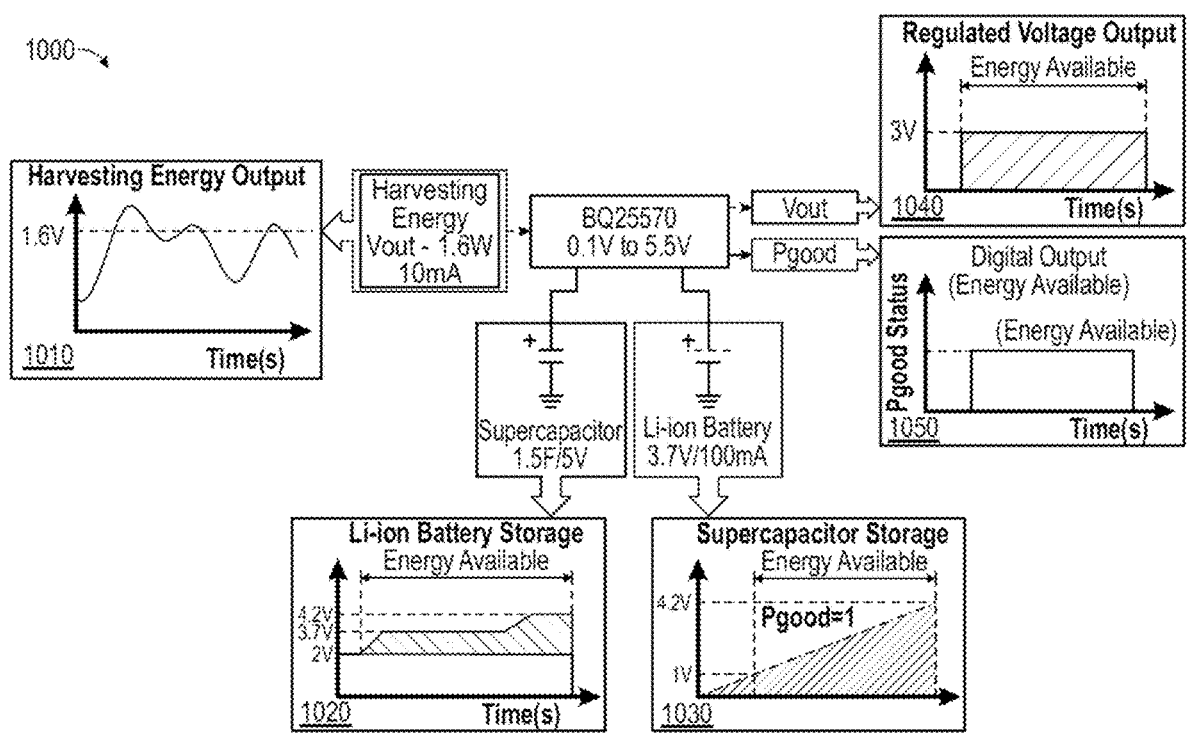
FIG. 10 shows a schematic diagram representative of a method for performing energy-harvesting in accordance with one or more embodiments.

FIG. 10 shows a flow process of energy-harvesting in accordance to one or more embodiments. In some embodiments, the sensor node device 160 harvests energy in a hazardous environment through a harvesting energy output 1010. In some applications, the energy-harvesting process is based on MI signal exchanges. In this case, a chip may be implemented if it uses an analog output pin that delivers the analog voltage $V_{out}$. Once a magnetic field reaching a specific sensor node device 160 is determined to be sufficiently strong, the chip may deliver any extra received RF power to the EMU. In this case, the microcontroller 780 works with stable voltage to avoid automatic reset at a low voltage level. To stabilize the voltage, the node may have an energy-harvesting controller based on two main components: an energy source (such as the transponder) and the EMU (a chip with a Nanopower Harvesting Energy Controller). The chip may efficiently extracts µW/mW (microwatts per miliwatt). The harvesting process may start when the voltage input is higher than 0.33V. After startup, the chip may harvest energy at a voltage higher than 0.1 V without collapsing the source.

In the node sensor device 160, the NFC interface may be a tag chip that, during communication with the EMU, transfers residual energy from the radiated power, which can be stored in the supercapacitor. FIG. 10 describes all of the energy conversion stages as numbered from 1010 to 1050. In stage 1010, after the configuration process is executed by the microcontroller in the NFC interface, and magnetic induction energy is available, the chip transfers the excess energy to the $V_{out}$ pin. The voltage is unregulated, as shown in stage 1010. The harvested energy is controlled by an internal converter and transferred to a battery 1020 or a supercapacitor 1030 based on an specific available configuration. While the available energy of a battery may be used between 2.0V and 4.2V that of a supercapacitor ranges between 1.0V and 5.0V. The energy capacity of a battery may be greater than that of a supercapacitor of a similar volume size. In addition, a battery can function in environments with a temperature range from −10 degrees to 60 degrees Celsius. The process of combining both the battery 1020 and the supercapacitor 1030 allows for a steady transfer of regulated $V_{out}$ 1040 and a digital power output 1050.

Figure 11:
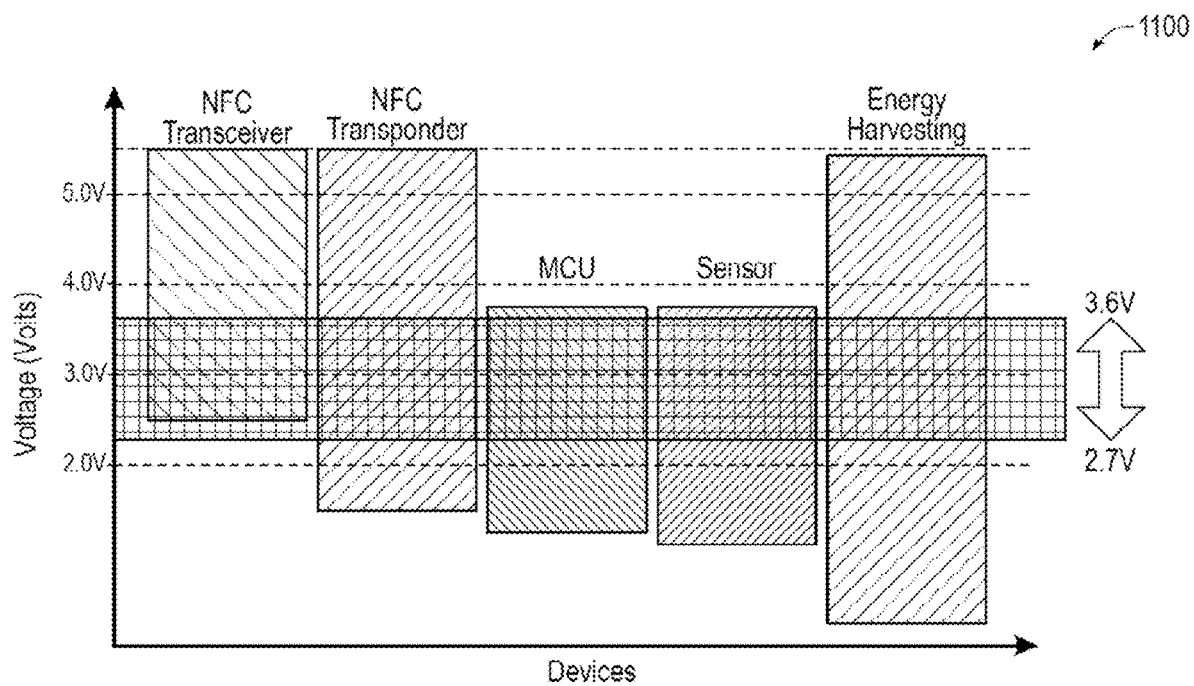
FIG. 11 shows a graph illustrating an integrated circuit voltage range in accordance with one or more embodiments.

FIG. 11 shows a graph illustrating an integrated circuit voltage range. In one or more embodiments, the microcontroller is responsible for generating control signals of the microcontroller and indicating whether energy is available. The hardware thresholds, such as the alert and output voltage threshold, may be used to set up any electronic characteristics for the controller. The output voltage may be configured based on an individual voltage chip range, as shown in FIG. 11. The minimum voltage to correct operation may be as high as 2.7V (this may be the minimum voltage of an NFC transceiver). The controller may be configured to generate 3.0V, which guarantees the operation of all chips without exceeding the minimum and maximum voltage limits. In a configuration operation between the covered range, all chips are able to operate within this voltage interval.

Figure 12:
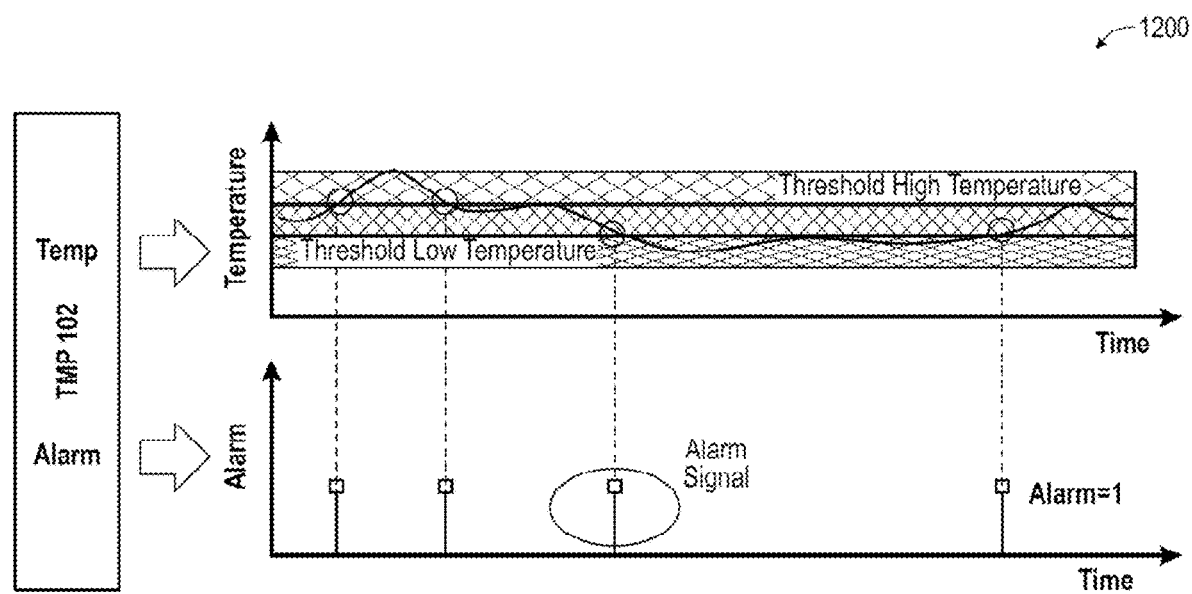
FIG. 12 shows a graph illustrating automatic temperature sensor thresholds in accordance with one or more embodiments.
Figure 13:
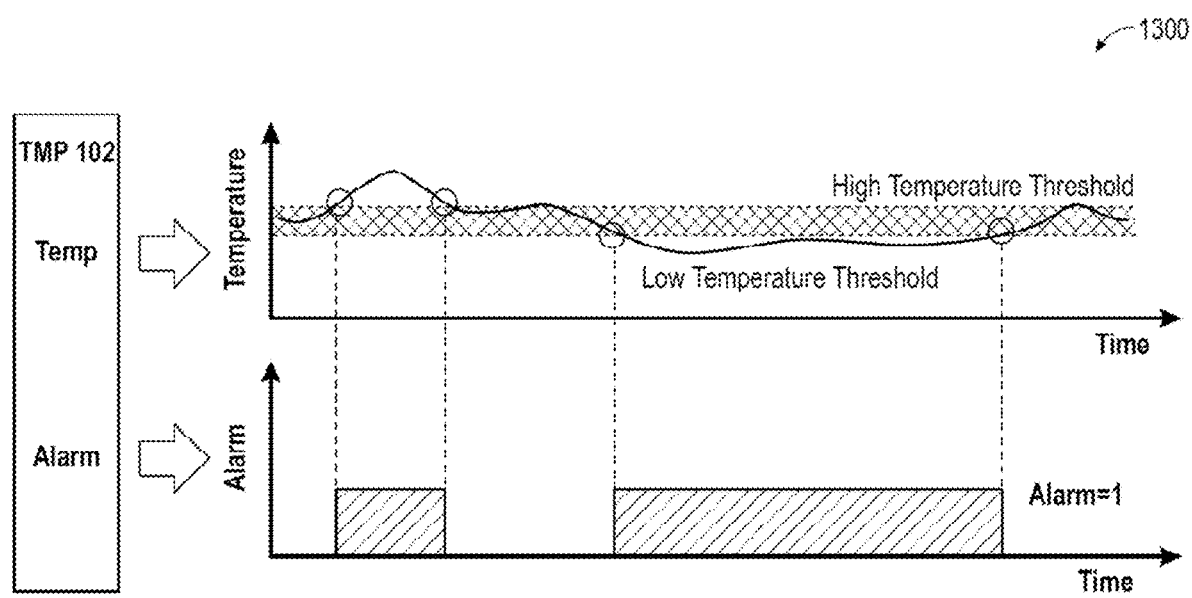
FIG. 13 shows a graph illustrating fixed threshold temperature alarm in accordance with one or more embodiments.

FIGS. 12 and 13 show graphs illustrating automatic temperature sensor thresholds. In FIG. 12, a TMP102 chip may be implemented as a high-resolution digital temperature sensor. The TMP102 chip is a temperature transducer that enables sensors to alert the microcontroller if a temperature measurement exceeds predefined thresholds, as shown in FIGS. 12 and 13. The sensor, which can operate between −40 degrees to 125 degrees Celsius, may be configured to work in an autonomous mode with an alarm signal when the temperature reaches a predefined threshold. As shown in FIG. 13, the thresholds may be remotely set up and updated according to formation/design requirements. This versatility allows an operator to implement an adaptive threshold that generates alarms only when the system detects a temperature change. Further, the configuration shows the autonomous operation of the temperature sensor, which shows that when the temperature crosses a predefined threshold for high or low temperature, the temperature sensor chip may automatically generate an alert signal that wakes up the microcontroller.

Figure 14:
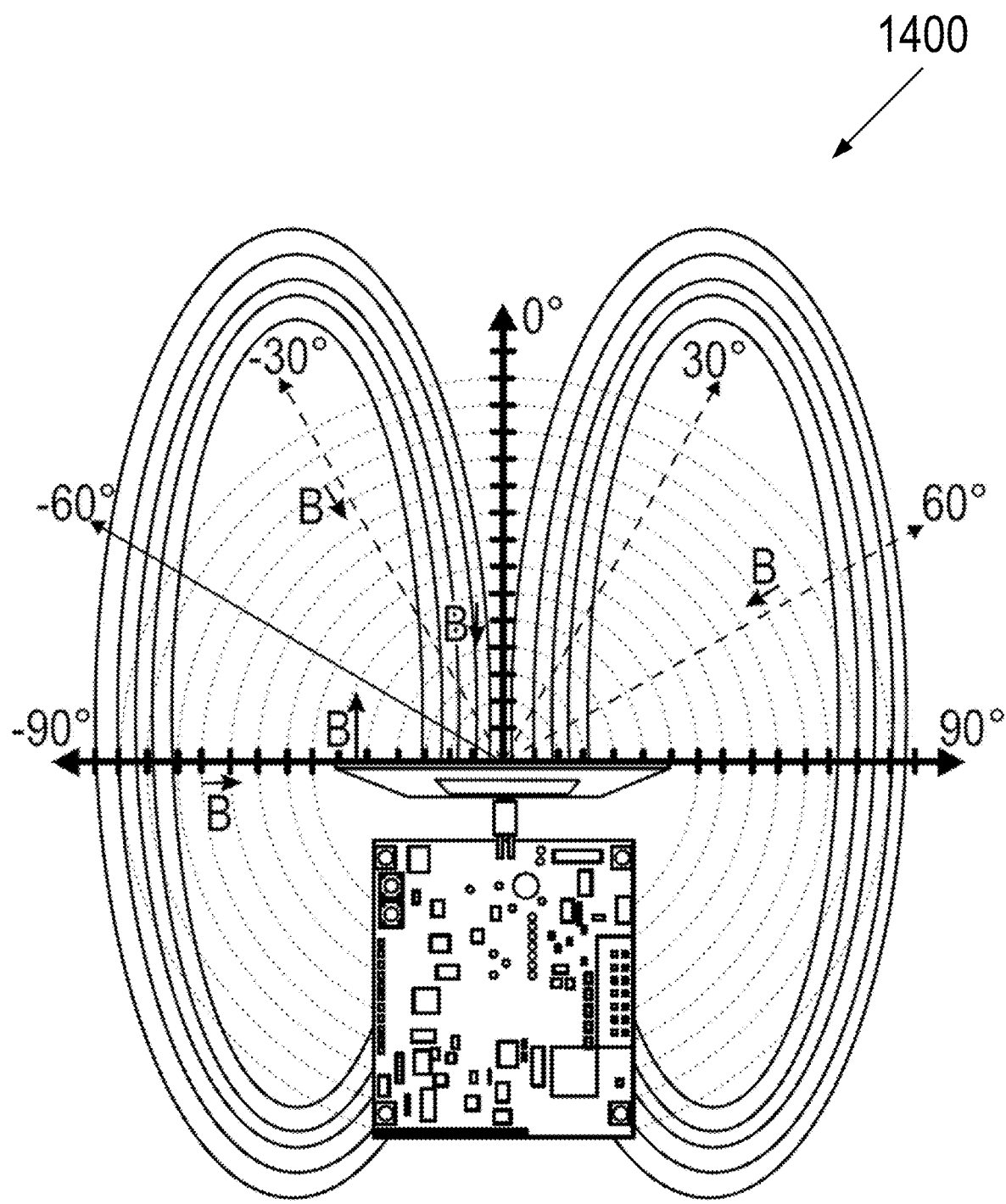
FIG. 14 shows an example of electromagnetic signals exchanged by a sensor node device in accordance with one or more embodiments.
Figure 15:
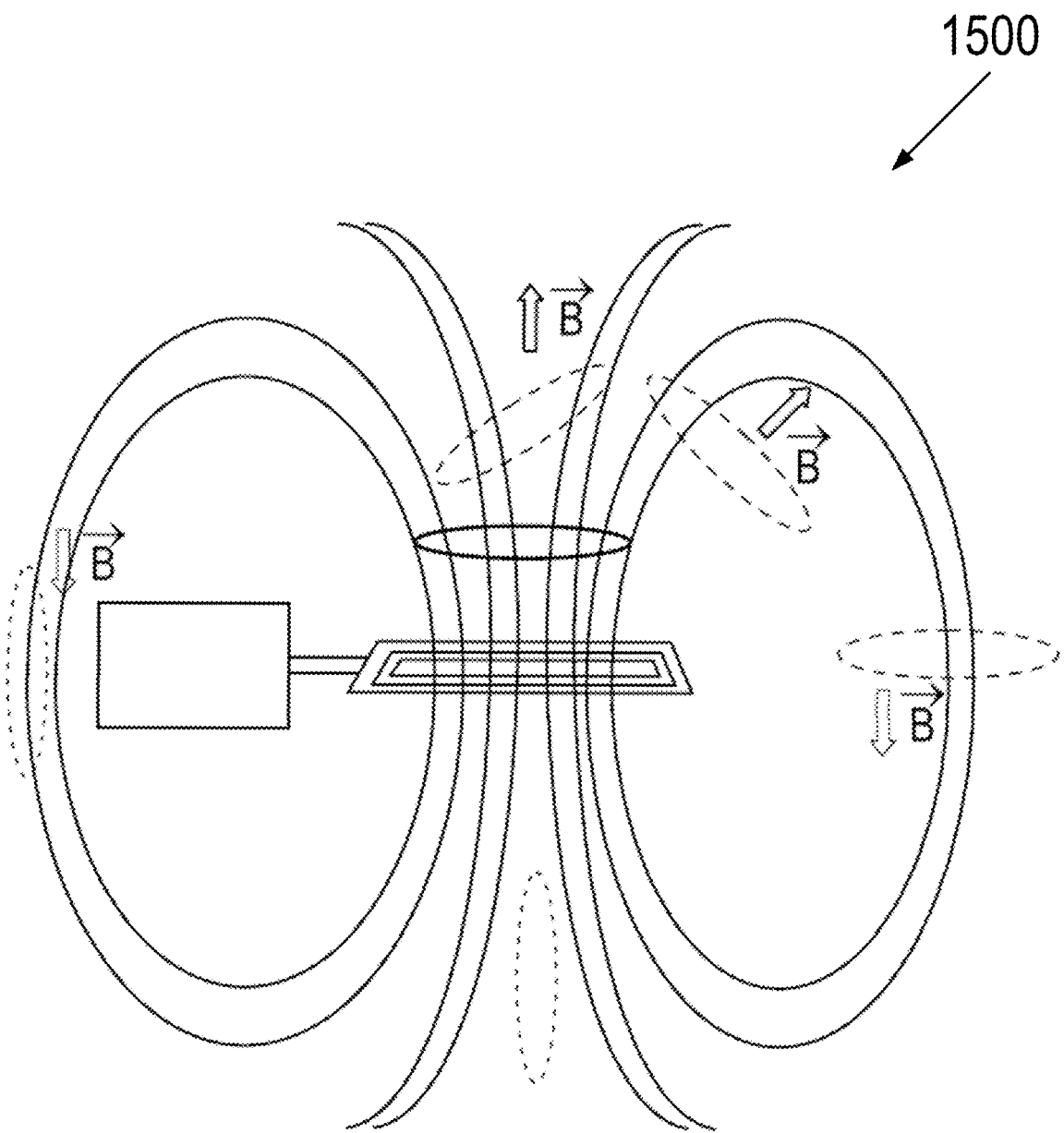
FIG. 15 shows an example of electromagnetic signals exchanged by a sensor node device in accordance with one or more embodiments.

FIGS. 14 and 15 show a couple of experimental setups 1400 and 1500 for a half-size sensor node device. In FIG. 14, the experimental setup evaluates node MI propagation at 13.56 MHz. The analyses were based on received power measurements using the CXA Signal Analyzer N9000A (from Agilent Technologies). In addition, the MI field generated by the transceiver with and without modulation was analyzed (for carrier only). The MI signal propagation was measured and analyzed in the air and the influence of the antenna orientation on the received power. FIG. 14 presents the schematic of the experimental setup and FIG. 15 shows the actual setup in the lab. In this experimental setup, the MI interaction was measured at distances between 0 and 25 cm and at angles of 0, 30, 60 and 90 degrees, respectively.

The results from the experiments showed that when the node operates in the energy transfer mode (i.e., an MI signal without modulation), energy transfer improves by 2 dBm in the air medium. Further, signal attenuation in sand and stone media is 20 dB stronger than that in air medium for a distance lower than 8 cm. Unexpectedly, energy transfer of distances of more than 10 cm in the air and sand media has the same amount of power as those calculated at 8 cm.

Figure 16:
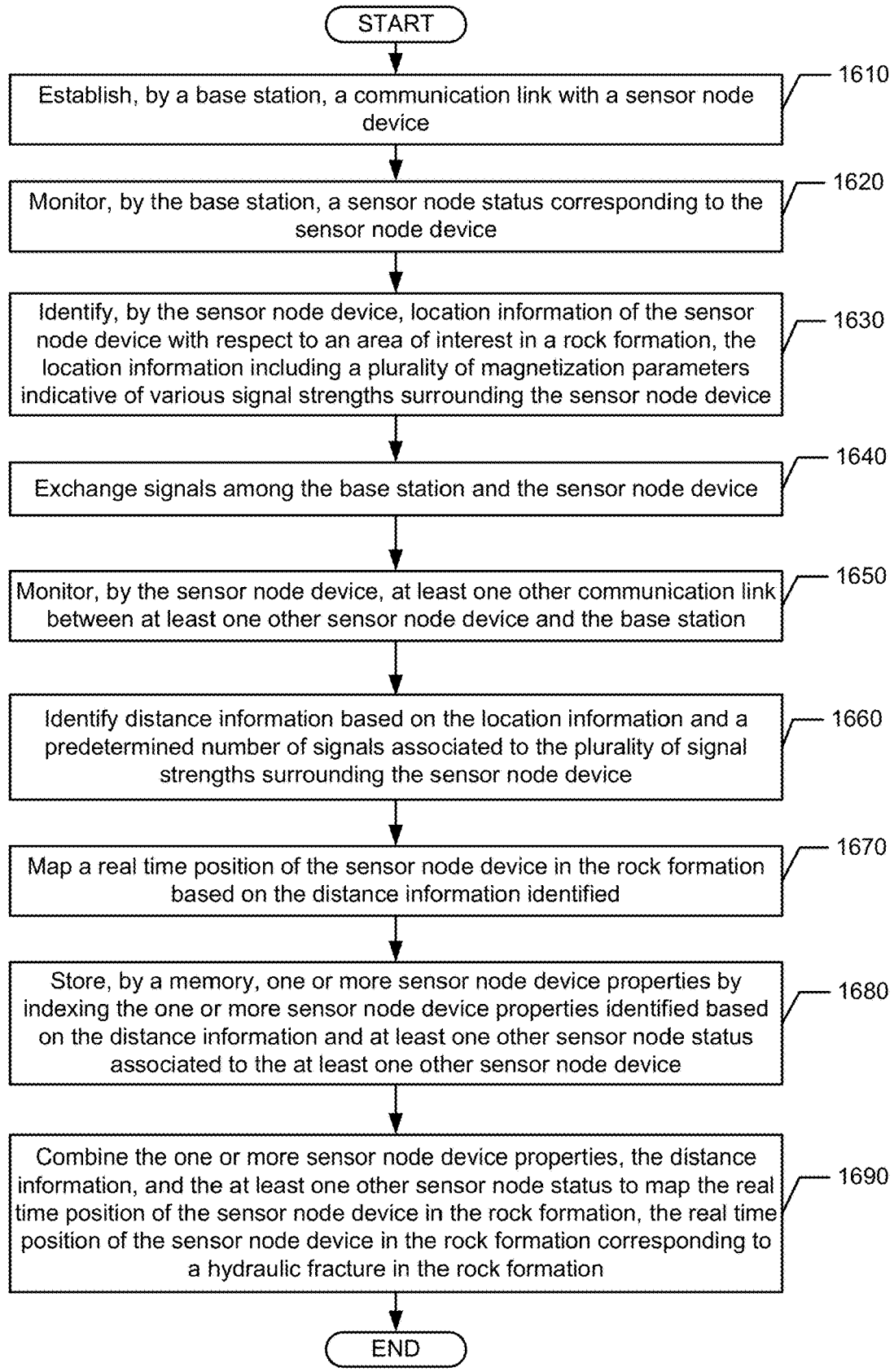
FIG. 16 shows a flowchart in accordance with one or more embodiments.

FIG. 16 shows a flowchart in accordance with one or more embodiments. Specifically, FIG. 16 describes a method for mapping hydraulic fractures using the sensor node system 150. In some embodiments, the method may be implemented using the devices described in reference to FIGS. 1-7C and 17. While the various blocks in FIG. 16 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

As explained above, the sensor node device 160 establishes node-to-node connectivity to generate and exchange data inside the formation 170 without human intervention. Multiple sensor node devices 160 may be used simultaneously to collect information from physical phenomena surrounding the devices. These physical phenomena may include temperature, pressure, or chemical composition of materials surrounding the devices in a given hydraulic fracture.

In Block 1610, the base station 110 establishes a communication link with a sensor node device 160. Upon establishing the communication link, the sensor node location tracking function 300 is triggered and collection for formation information 310 is allowed to start.

In Block 1620, the base station 110 monitors a sensor node status corresponding to the sensor node device 160. As discussed in reference to FIGS. 4A-4E, multiple sensor node devices are deployed and tracked using MI communication links. At least one sensor node device 160 is tracked and its status is controlled to identify a status of continuous transmission or a status of transmission interruption. The sensor node device 160 provides a constant feedback of its status through a status identifier. The status identifier provides a clear indication of the communication condition for the sensor node device 160 through a header compression scheme.

In Block 1630, the sensor node device 160 identifies location information of the sensor node device 160 with respect to an area of interest in a rock formation. The location information includes various magnetization parameters indicative of various signal strengths surrounding the sensor node device 160. In addition to the status identifier, the sensor node device 160 provides the base station 110 with a string of values listing transmission strengths for all signals previously received by the sensor node device 160. The location information may be extrapolated by the control system 130 from the signal strength of the MI communication with the sensor node device 160 and the string of values included in the transmission from the sensor node device 160.

In Block 1640, signals are exchanged among the base station 110 and the sensor node device 160. These signals include the aforementioned transmissions described at least in reference to FIGS. 4A-4E.

In Block 1650, the sensor node device 160 monitors at least one other communication link between at least one other sensor node device 160 and the base station 110. This is achieved through a comparison of the signals obtained from the sensor node device 160 and the signals obtained from the at least one other sensor by the base station 110.

In Block 1660, distance information is identified based on the location information and a predetermined number of signals associated to the various signal strengths surrounding the sensor node device 160.

In Block 1670, a real time position of the sensor node device 160 is mapped in the rock formation based on the distance information identified. An initial map of the rock formation is superimposed to an estimated position of the sensor node device 160 at each instance in which the location is estimated. The initial map may be updated every time that the sensor node device 160 transmits a signal. The updated map may be tracked in an electronic database or in a visual display.

In Block 1680, a memory stores one or more sensor node device properties by indexing the one or more sensor node device properties identified based on the distance information and at least one other sensor node status associated to the at least one other sensor node device.

In Block 1690, the one or more sensor node device properties, the distance information, and the at least one other sensor node status are combined to map the real time position of the sensor node device in the rock formation. The real time position of the sensor node device 160 in the rock formation 170 corresponds to a hydraulic fracture in the rock formation shown in the initial map or the updated map.

While FIGS. 1-16 show various configurations of components, other configurations may be used without departing from the scope of the disclosure. For example, various components in FIG. 1-15 may be combined to create a single component. As another example, the functionality performed by a single component may be performed by two or more components.

Figure 17:
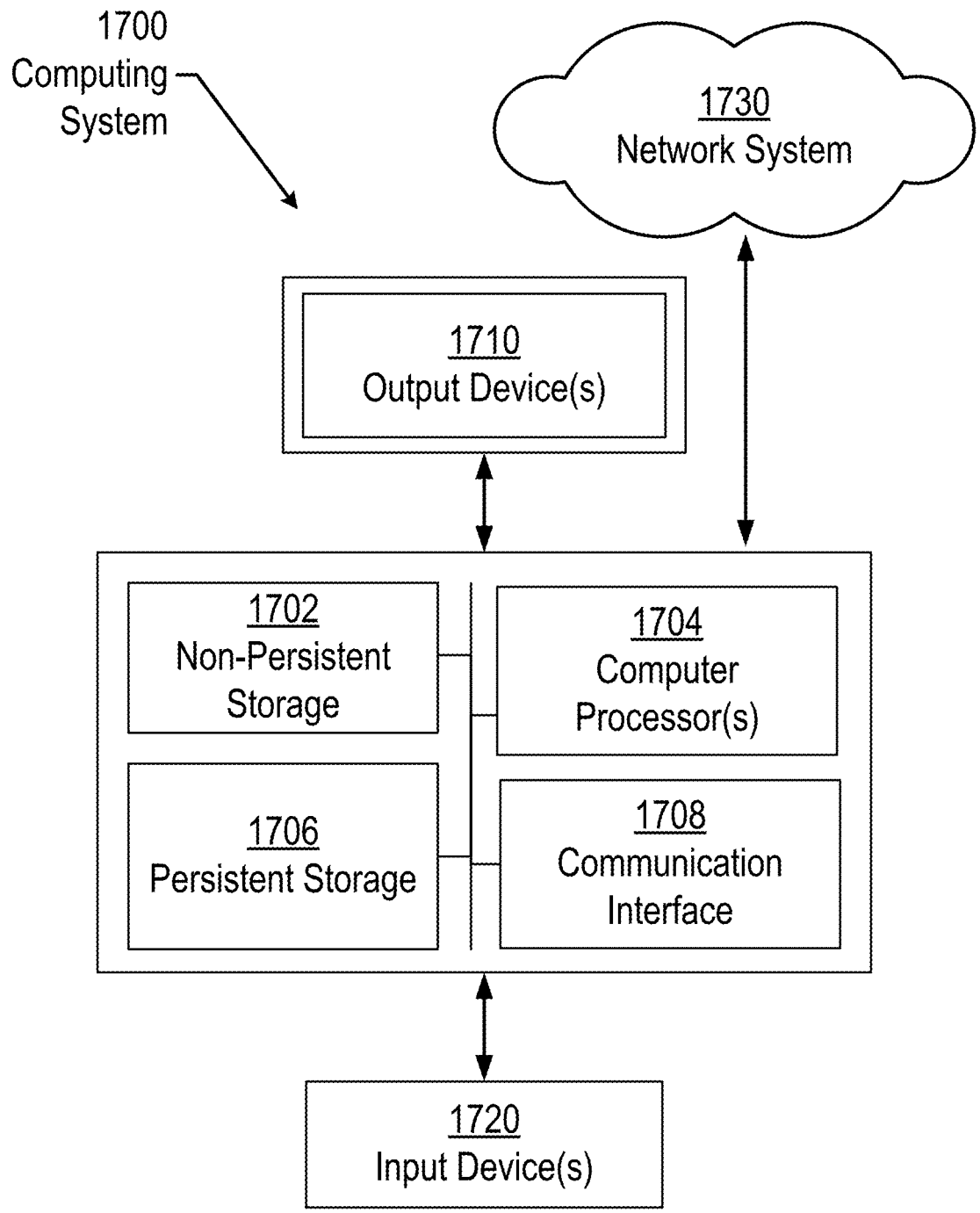
FIG. 17 shows an example of a computer system in accordance with one or more embodiments.

As shown in FIG. 17, the computing system 1700 may include one or more computer processor(s) 1704, non-persistent storage 1702 (e.g., random access memory (RAM), cache memory, or flash memory), one or more persistent storage 1706 (e.g., a hard disk), a communication interface 1708 (transmitters and/or receivers) and numerous other elements and functionalities. The computer processor(s) 1704 may be an integrated circuit for processing instructions. The computing system 1700 may also include one or more input device(s) 1720, such as a touchscreen, keyboard, mouse, microphone, touchpad, electronic pen, or any other type of input device. In some embodiments, the one or more input device(s) 1720 may be the control system 130 described in reference to FIG. 1 connected to the sensor node devices 160 described in reference to FIGS. 1, 2, and 5-15. Further, the computing system 1700 may include one or more output device(s) 1710, such as a screen (e.g., a liquid crystal display (LCD), a plasma display, or touchscreen), a printer, external storage, or any other output device. One or more of the output device(s) may be the same or different from the input device(s). The computing system 1700 may be connected to a network system 1730 (e.g., a local area network (LAN), a wide area network (WAN) such as the Internet, mobile network, or any other type of network) via a network interface connection (not shown).

In one or more embodiments, for example, the input device 1720 may be coupled to a receiver and a transmitter used for exchanging communication with one or more peripherals connected to the network system 1730. The receiver may receive information relating to one or more reflected signals as described in reference to FIGS. 3-15. The transmitter may relay information received by the receiver to other elements in the computing system 1700. Further, the computer processor(s) 1704 may be configured for performing or aiding in implementing the processes described in reference to FIGS. 3-15.

Further, one or more elements of the computing system 1700 may be located at a remote location and be connected to the other elements over the network system 1730. The network system 1730 may be a cloud-based interface performing processing at a remote location from the well site and connected to the other elements over a network. In this case, the computing system 1700 may be connected through a remote connection established using a 5G connection, such as protocols established in Release 15 and subsequent releases of the 3GPP/New Radio (NR) standards.

The computing system in FIG. 17 may implement and/or be connected to a data repository. For example, one type of data repository is a database (i.e., like databases). A database is a collection of information configured for ease of data retrieval, modification, re-organization, and deletion. In some embodiments, the databases include published/measured data relating to the method, the systems, and the devices as described in reference to FIGS. 1-16.

While FIGS. 1-17 show various configurations of components, other configurations may be used without departing from the scope of the disclosure. For example, various components in FIGS. 1-7C and 17 may be combined to create a single component. As another example, the functionality performed by a single component may be performed by two or more components.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed is:

1. A sensor node device included in a sensor node system for mapping hydraulic fractures, the sensor node device comprising:
  a localization system that identifies location information of the sensor node device with respect to an area of interest in a rock formation, the location information including a plurality of magnetization parameters indicative of a plurality of signal strengths surrounding the sensor node device;
  a transceiver that exchanges signals with a base station and at least one other sensor node device, the transceiver establishing a communication link between the base station and the sensor node device and monitoring at least one other communication link between the at least one other sensor node device and the base station;
  a processor that identifies distance information based on the location information and a predetermined number of signals associated to the plurality of signal strengths surrounding the sensor node device; and
  a coordination system that maps a real time position of the sensor node device in the rock formation based on the distance information identified.

2. The sensor node device of claim 1, wherein the distance information includes:
  a first distance between the sensor node device and a surface of a well site,
  a second distance between the sensor node device and the at least one other sensor node device, and
  a third distance between the sensor node device and the base station.

3. The sensor node device of claim 2, the sensor node device further comprising:
  a memory that stores one or more sensor node device properties, the memory indexing the one or more sensor node device properties identified based on the distance information and at least one sensor node status associated to the sensor node device.

4. The sensor node device of claim 3, wherein the processor combines the one or more sensor node device properties, the distance information, and the at least one sensor node status to map the real time position of the sensor node device in the rock formation, the real time position of the sensor node device in the rock formation corresponding to a hydraulic fracture in the rock formation.

5. The sensor node device of claim 1, the sensor node device further comprising:

an energy management device that performs energy harvesting based on magnetic induction, the energy management device harvesting energy with an internal converter; and a power supply that stores energy harvested, the energy harvested being transferred to a battery or a supercapacitor based on a predetermined configuration.

6. The sensor node device of claim 5, wherein the energy management device is coupled to the processor, the processor controlling an energy-saving clock that maintains a continuous low-frequency to reduce energy consumption of the sensor node device.

7. The sensor node device of claim 1, wherein the transceiver further:

establishes a communication link with a control system, transmits operation information of a well site to the control system, the control system performing data evaluation to determine a signal strength of the communication link with the control system, and receives one or more instruction signals from the control system, the one or more instruction signals including results from a reservoir simulation performed by the control system.

8. The sensor node device of claim 1, the sensor node device further comprising:

a cell group sensing element that stabilizes communications associated with the transceiver by preventing interferences between the transceiver and the rest of the sensor node device.

9. The sensor node device of claim 1, the sensor node device further comprising:

a transponder comprising a dual-interface memory chip that uses an NFC interface, the NFC interface that accesses a plurality of neighboring sensor node devices and their corresponding sensor node statuses.

10. The sensor node device of claim 1, the sensor node device further comprising:

at least one collector sensor that monitors a plurality of physical phenomena inside the sensor node device and outside the sensor node device.

11. The sensor node device of claim 10, wherein the at least one collector sensor is a high-resolution digital temperature sensor, the high-resolution digital temperature sensor autonomously alerts the processor when a temperature inside the sensor node device reaches a predetermined threshold.

12. The sensor node device of claim 11, wherein the high-resolution digital temperature sensor is coupled to the processor to determine a future temperature inside the sensor node device and autonomously alerts the processor in real-time upon predicting that the future temperature inside the sensor node device will reach the predetermined threshold over a predetermined period of time.

13. A sensor node system for mapping hydraulic fractures, the sensor node system comprising:

a base station comprising:
a transmitter coupled to a first processor that establishes a first plurality of communication links with a plurality of sensor node devices, and
a receiver coupled to the first processor that monitors a plurality of sensor node statuses corresponding to the plurality of sensor node devices; and a sensor node device comprising:
a localization system that identifies location information of the sensor node device with respect to an area of interest in a rock formation, the location information including a plurality of magnetization parameters indicative of a plurality of signal strengths surrounding the sensor node device;
a transceiver that exchanges signals with the base station and at least one other sensor node device, the transceiver establishing a communication link between the base station and the sensor node device and monitoring at least one other communication link between the at least one other sensor node device and the base station;
a second processor that identifies distance information based on the location information and a predetermined number of signals associated to the plurality of signal strengths surrounding the sensor node device; and
a coordination system that maps a real time position of the sensor node device in the rock formation based on the distance information identified.

14. The sensor node system of claim 13, wherein the distance information includes:

a first distance between the sensor node device and a surface of a well site, a second distance between the sensor node device and the at least one other sensor node device, and a third distance between the sensor node device and the base station.

15. The sensor node system of claim 14, wherein the sensor node device further comprises:

a memory that stores one or more sensor node device properties, the memory indexing the one or more sensor node device properties identified based on the distance information and at least one sensor node status associated to the sensor node device.

16. The sensor node system of claim 15, wherein the second processor combines the one or more sensor node device properties, the distance information, and the at least one sensor node status to map the real time position of the sensor node device in the rock formation, the real time position of the sensor node device in the rock formation corresponding to a hydraulic fracture in the rock formation.

17. The sensor node system of claim 13, wherein the sensor node device further comprises:

an energy management device that performs energy harvesting based on magnetic induction, the energy management device harvesting energy with an internal converter; and a power supply that stores energy harvested, the energy harvested being transferred to a battery or a supercapacitor based on a predetermined configuration.

18. The sensor node system of claim 17, wherein the energy management device is coupled to the second processor, the second processor controlling an energy-saving clock that maintains a continuous low-frequency to reduce energy consumption of the sensor node device.

19. The sensor node system of claim 13, the sensor node system further comprising:

a control system that:
establishes a second plurality of communication links with the plurality of sensor node devices,
receives operation information of a well site from the plurality of sensor node devices,
performs data evaluation to determine a plurality of signal strengths of the second plurality of communication links,
performs a reservoir simulation to predict a future movement of the plurality of sensor node devices in the rock formation, and transmits one or more instruction signals to the plurality of sensor node devices, the one or more instruction signals including results from the reservoir simulation.

20. A method for mapping hydraulic fractures using a sensor node system, the method comprising:
establishing, by a base station, a communication link with a sensor node device;
monitoring, by the base station, a sensor node status corresponding to the sensor node device;
identifying, by the sensor node device, location information of the sensor node device with respect to an area of interest in a rock formation, the location information including a plurality of magnetization parameters indicative of a plurality of signal strengths surrounding the sensor node device;
exchanging signals among the base station and the sensor node device;
monitoring, by the sensor node device, at least one other communication link between at least one other sensor node device and the base station;
identifying distance information based on the location information and a predetermined number of signals associated to the plurality of signal strengths surrounding the sensor node device;
mapping a real time position of the sensor node device in the rock formation based on the distance information identified;
storing, by a memory, one or more sensor node device properties by indexing the one or more sensor node device properties identified based on the distance information and at least one other sensor node status associated to the at least one other sensor node device; and
combining the one or more sensor node device properties, the distance information, and the at least one other sensor node status to map the real time position of the sensor node device in the rock formation, the real time position of the sensor node device in the rock formation corresponding to a hydraulic fracture in the rock formation.

* * * * *